United States Patent [19]
Horton

[11] Patent Number: 5,777,736
[45] Date of Patent: Jul. 7, 1998

[54] HIGH ETENDUE IMAGING FOURIER TRANSFORM SPECTROMETER

[75] Inventor: Richard F. Horton, Los Lunas, N. Mex.

[73] Assignee: Science Applications International Corporation, San Diego, Calif.

[21] Appl. No.: 684,925

[22] Filed: Jul. 19, 1996

[51] Int. Cl.[6] ............................................. G01B 9/02
[52] U.S. Cl. ............................................ 356/346
[58] Field of Search ........................... 356/346, 354; 250/339.07, 339.08

[56] References Cited

U.S. PATENT DOCUMENTS

| | | | |
|---|---|---|---|
| 4,509,857 | 4/1985 | Vermande | 356/346 |
| 4,523,846 | 6/1985 | Breckinridge et al. | 356/346 |
| 4,957,371 | 9/1990 | Pellicori et al. | 356/419 |
| 5,059,027 | 10/1991 | Roesler et al. | 356/346 |
| 5,131,747 | 7/1992 | Cerutti-Maori et al. | 356/346 |
| 5,223,910 | 6/1993 | Simeoni et al. | 356/346 |
| 5,416,325 | 5/1995 | Bountempo et al. | 250/339.08 |

OTHER PUBLICATIONS

Demro, et al., "Design of a Multispectral, Wedge Filter, Remote-Sensing Instrument Incorporating a Multi-Port, Thinned, CCD Area Array", *SPIE Aerosense '95 Imaging Spectrometry Session*, pp. 1-7 (Apr. 1995).

Mailhes, et al., "Spectral Image Compression", *SPIE Advanced Optical Instrumentation for Remote Sensing of the Earth's Surface from Space*, vol. 1129, pp. 85-90 (1989).

Vermande,"High-Spectral Resolution Remote-Sensing Instruments Developed and Under Development at CNES", *Proceedings of the 3rd International Colloquium on Spectral Signatures of Objects in Remote Sensing, Les Arcs, France*, 16-20 Dec., pp. 227-232, (1985) (ESA SP 247).

Vermande, et al., "Interferometric Spectro-Imager System (ISIS)", *SPIE Optical System for Space Applications*, vol. 810, pp. 117-124 (1987).

*Primary Examiner*—Samuel A. Turner
*Attorney, Agent, or Firm*—Fitch, Even, Tabin & Flannery

[57] ABSTRACT

A high etendue imaging Fourier transform spectrometer which utilizes a two beam interferometer is provided. The high etendue imaging Fourier transform spectrometer is adapted to create an image of an entire target area with the resolution and throughput comparable to that of a Michelson interferometer based spectrometer yet does not require moving parts. The disclosed imaging spectrometer is comprised of various image forming optical elements; an two beam interferometer, which provides two interfering images at the image plane, resulting in the spectral autocorrelation modulation of the scene image; a CCD array camera to detect this interference modulated image; a scanning mechanism to translate the image scene through the autocorrelation modulated image plane thereby allowing a sequence of the modulated scene images to be recorded; a control system for operatively controlling the image forming optical elements, the scanning mechanism and CCD array camera; and an image data analyzer adapted for recording and processing the intensity modulation signal including the step of Fourier transforming the intensity modulation signal for each of individual scene area of the target which yields the spectrum associated with each scene area.

30 Claims, 16 Drawing Sheets

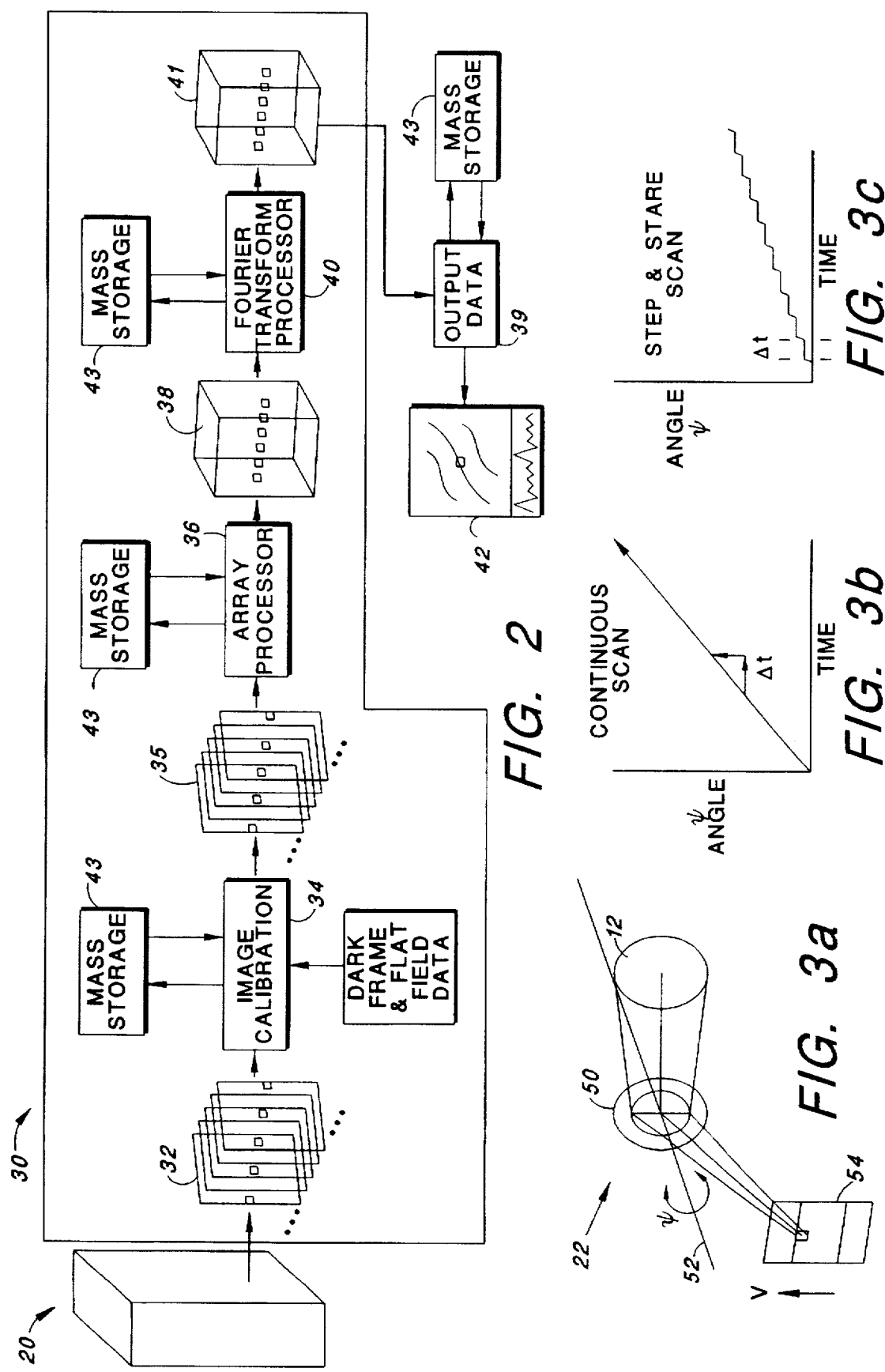

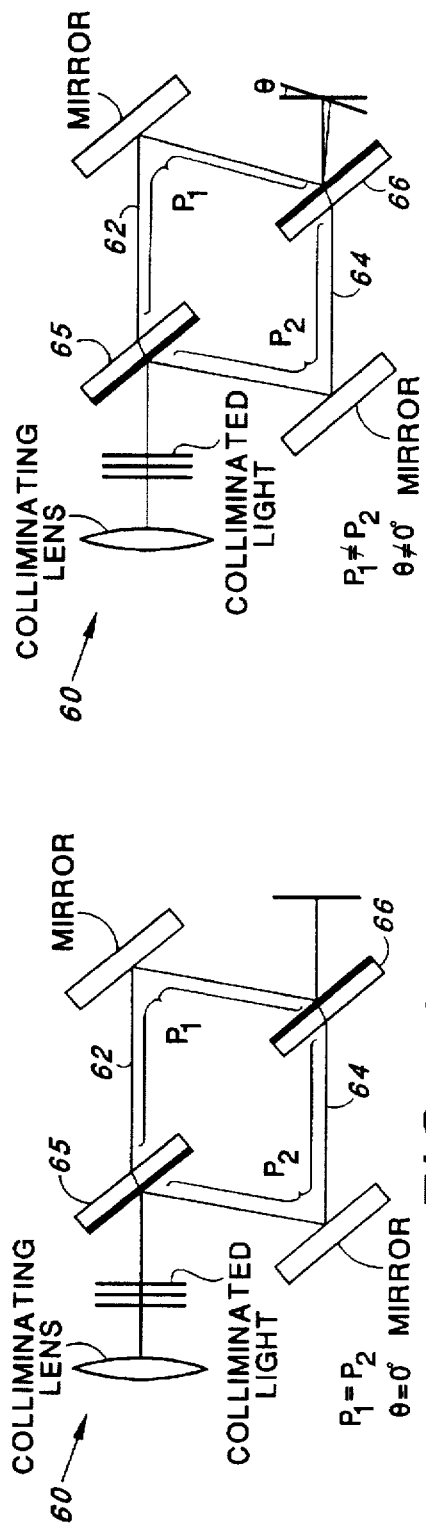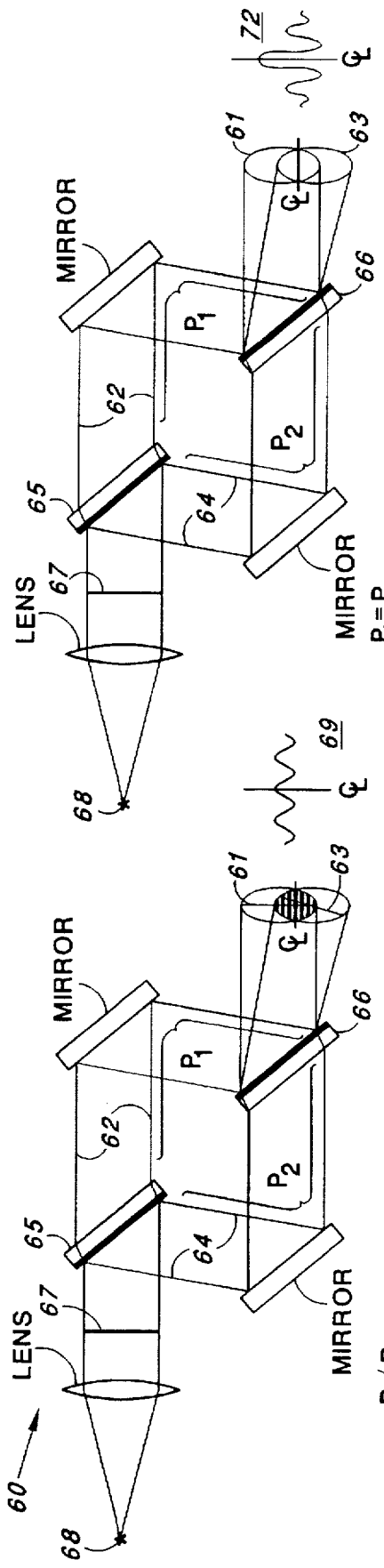

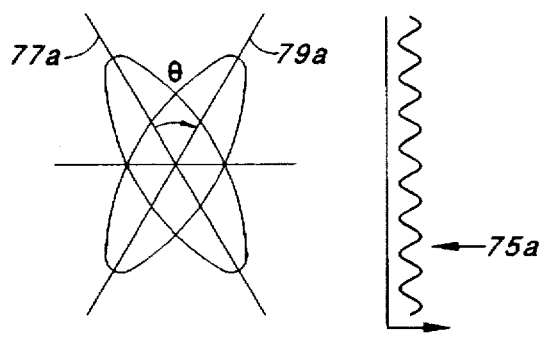
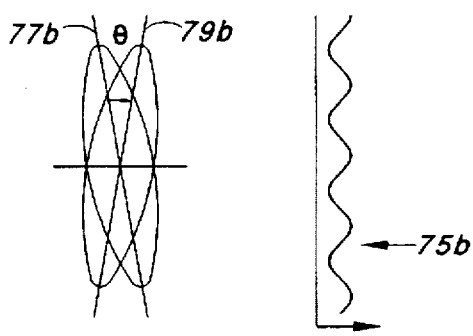
FIG. 6a
FIG. 6b
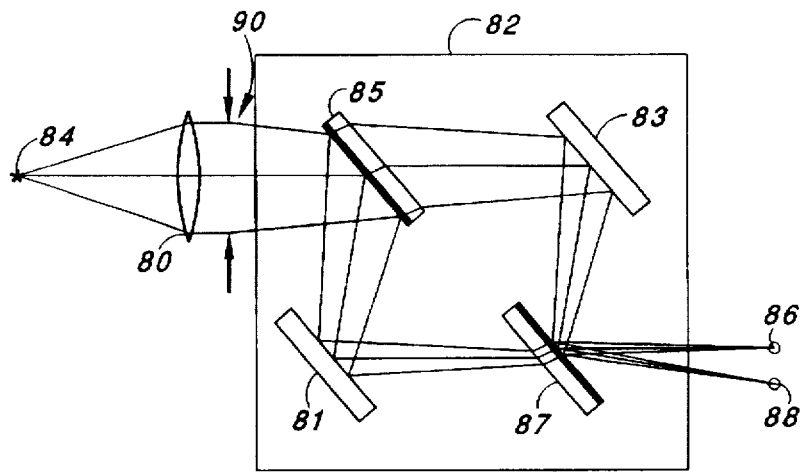
FIG. 7a
(PRIOR ART)
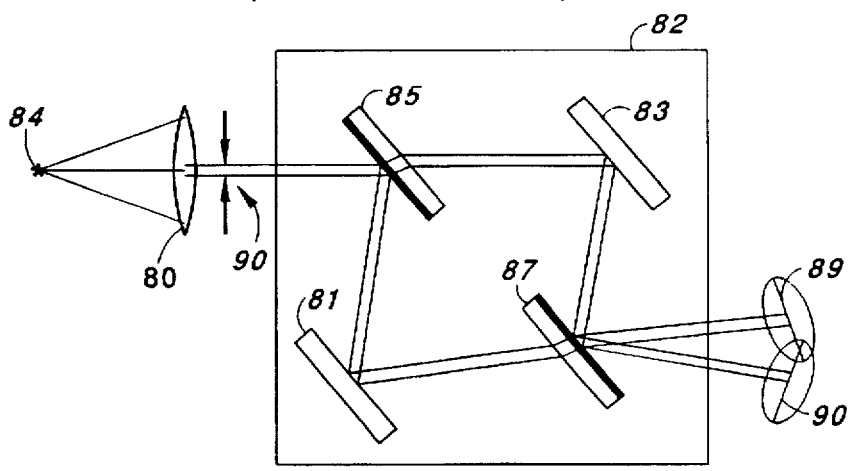
FIG. 7b
(PRIOR ART)

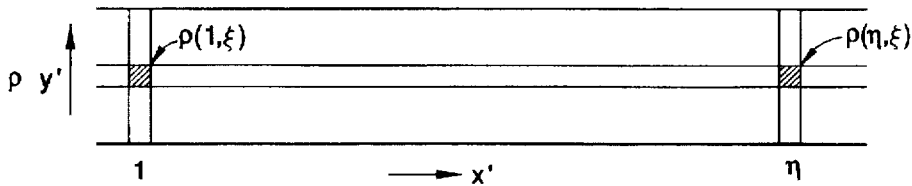

$A\rho(\eta,\xi,\kappa)=D_{i,j,k}$ for $i=N-\kappa+1$, $j=\xi$, $k=\eta+\kappa-1$

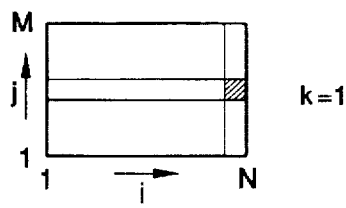

$D_{i=N, j=\xi, k=1}$
$= A\rho(\eta=1, \xi=\xi, \kappa=1)$

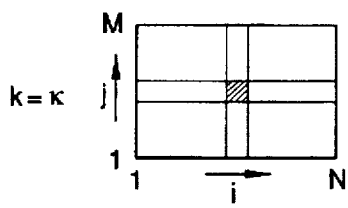

$D_{i=N-\kappa+1, j=\xi, k=\kappa}$
$= A\rho(\eta=1, \xi=\xi, \kappa=k)$

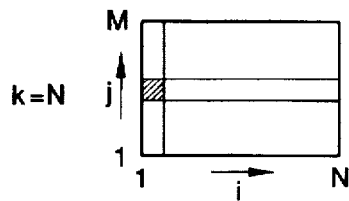

$D_{i=1, j=\xi, k=N}$
$= A\rho(\eta=1, \xi=\xi, \kappa=k)$

. . .

$D_{i=N, j=\xi, k=\eta}$
$= A\rho(\eta=\eta, \xi=\xi, \kappa=1)$

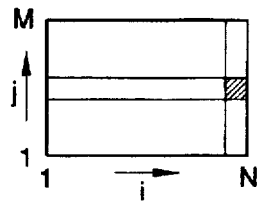

$D_{i=N-\kappa+1, j=\xi, k=\eta+\kappa-i}$
$= A\rho(\eta=\eta, \xi=\xi, \kappa=k)$

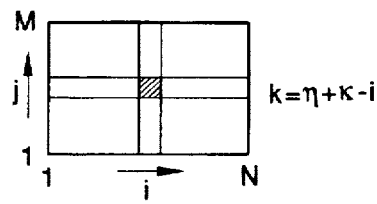

$D_{i=N-\kappa+1, j=\xi, k=\eta+\kappa-1}$
$= A\rho(\eta=\eta, \xi=\xi, \kappa=N)$

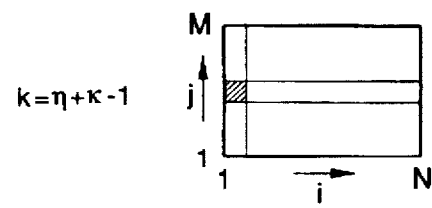

*FIG. 15b*

HIGH ETENDUE IMAGING FOURIER TRANSFORM SPECTROMETER

FIELD OF THE INVENTION

The present invention relates to the field of optical imaging spectrometers, and more particularly to imaging systems utilizing Fourier Transform interferometer based Spectrometers. Still more particularly, the present invention relates to a High Etendue (throughput) Imaging Fourier Transformer Spectrometer, which utilizes no moving parts for Fourier transform modulation, yet provides spectral resolution comparable to single image point Michelson interferometer based spectrometers and throughput comparable to direct imaging cameras.

BACKGROUND OF THE INVENTION

Imaging systems record the intensity of radiation measured at points over a two dimensional area, with the resulting measurement being referred to as an image. Modern digital imaging devices measure the intensity of radiation over a two dimensional array of points, with the area equivalent to a single measurement point being referred to as a pixel. A spectrometer is an optical device for measuring the spectrum of radiation from a single radiant energy source as a function of wavelength, and recording the resultant spectrum as a series of power measurements per spectral interval over some set of spectral intervals for that point. Modern digital spectrometers record an array of spectral intensities, with either wavenumber or wavelength incremented as the spectral array increment.

A modern digital imaging spectrometer system combines these two functions (i.e., imaging and spectroscopy), recording the spectral intensity array for each point in a two dimensional array or image. The result is a three dimensional "cube" of data corresponding to two spatial dimensions and one spectral dimension. The spectral dimension is either in units of wavelength or wavenumber depending upon the type of spectrometer.

Imaging spectrometer systems are particularly adapted for use in reconnaissance systems suitable for, observing the world from moving satellite platforms, aircraft platforms, or ground based (i.e. tactical) positions. Imaging spectrometers are also used in environmental monitoring operations, ground and satellite observations of distant objects (i.e. astronomy and planetary exploration observations), and medical imaging systems.

There are many types of imaging spectrometers currently in use, the optical designs of which differ greatly. Essentially, there are three broad categories into which imaging spectrometers are grouped with each category being based on the form of spectral measurement employed. The first category of imaging spectrometers use a plurality of filters to obtain the spectral data of an image. The second category includes imaging spectrometers that employ dispersive techniques to obtain the spectral data of a slice of an image. Finally, there are those imaging spectrometers which utilize Fourier transform interferometer techniques.

A typical imaging spectrometer of the first category, using filters, consists of an objective lens which collects the radiation from an object scene and images this scene through a filter onto the surface of an imaging detector. The imaging detector converts the incident radiation into electrical signals corresponding to the image of the scene at the passband of the filter. As the spectrometer stares at the scene, the filter passband is changed, and successive images are recorded. This process is repeated, wavelength interval by wavelength interval, until the entire spatial-spectral data cube is built up, quite literally layer by layer.

An important variation of this first group is the "Wedge Imaging Spectrometer". This device uses a filter which has a linear variable passband which varies along one axis of the imaging array. The image of the object scene is "pushbroomed scanned" in one dimension along the one axis as the images are sequentially read out, forming a data array which is then reprocessed to yield the standard data "cube" format (i.e., "$\Delta X, \Delta Y, \Delta \lambda$").

An imaging spectrometer of the second category, using a dispersive element, typically consists of an objective lens which collects the radiation from a line of point sources and images this line of points onto the slit of a spectrometer. The spectrometer is configured to disperse the light from this line of point sources onto a rectangular detector array capable of converting the incident radiation from each point into electrical signals corresponding to a spectrum of the point. In this fashion, a two dimensional slice of data is recorded with spatial information in one axis and spectral wavelength information in the other. Finally, a scan mirror is used to index the instantaneous field of view perpendicular to the line of images for that device, and the process is repeated line by line, to provide the second dimension of spatial coverage of the data "cube".

The final general category of imaging spectrometers makes use of Fourier transform interferometer spectrometer techniques. There are currently two types of Fourier transform devices in common usage. One type is based upon the Michelson interferometer whereas the second type is based on the Sagnac interferometer.

It is well known in the art that Fourier transform interferometer spectrometers offer significant advantages over other forms of spectrometers. In particular, the primary advantages of an interference spectrometer is the relatively high throughput and signal to noise ratio for a given spectral resolution. This is because interferometer spectrometers allow the measurement of a light source's autocorrelation function, which is approximately half the average signal level, instead of a widely subdivided spectral signal. The autocorrelation signal is then Fourier transformed to obtain the spectra of the source. In the art, this is known as Fellgett's advantage or the multiplex advantage.

Considering the two current forms of imaging spectrometers, based upon the Michelson and Sagnac interferometers, it is important to remember that the interference pattern is just a method by which to generate the autocorrelation function of the spectral content of a source. The interference modulation in the case of the Michelson interferometer forms a temporal record of the autocorrelation function, while in the case of the Sagnac interferometer the interference phenomenon forms a spatial record of the autocorrelation function.

The Michelson interferometer is a well known device for the study of the wave phenomenon of light. The common embodiment of this device includes a partially mirrored surface, which serves as a beamsplitter, to divide a beam of light into two beams that are directed to travel in different directions. One portion of the divided beam reflects off a flat reference mirror back to the beam splitter. The position of the reference mirror is normally not varied. The other divided beam reflects off of a second surface and returns back through the beam splitter where the two divided beams are recombined.

The path length to and from the second mirror may be varied. As the path length is varied, recombining optical waveforms that are out of phase partially or totally cancel one another out, allowing no light to be detected where the beams are recombined. On the other hand, when the waveforms are in phase and reinforce each other, the light is detectable where the beams are recombined. Interference fringes are produced when the overlapping light patches are "coherent". Coherence is both longitudinal, i.e. varies along the lights propagation axis or with the interferometer path length, and lateral, i.e. varies with distance perpendicular to the propagation axis.

To allow for optical symmetry in the beams, a tilted "compensating plate" is added to the path which does not travel through the beamsplitter substrate. This plate is made of the same glass and is of the same thickness and tilt as the beamsplitter. The compensating plate allows the dispersion to be equivalent in the two optical paths.

A Michelson interferometer used as a spectrometer is called a scanning Michelson interferometer Fourier transform spectrometer. In the common embodiment, a detector is positioned where the two light beams are recombined. As the path length to one of the mirrors, referred to as the scanning mirror, is varied, the light observed at the detector varies in brightness. The amplitude of the light at this position can be shown to be the autocorrelation function of the waveform as a function of scanning mirror position. The autocorrelation function of the waveform is exactly the Fourier transform of the spectra of the waveform. Hence, if the scanning mirror is moved very precisely, and the amplitude of light recorded at precise intervals in the scan, the resultant temporal record of the light intensity can be Fourier transformed to yield the spectrum of the source. Note that in the case of a Fourier transform spectrometer, the spectral data is yielded in units of "wavenumber" or $\Delta\upsilon$.

As indicated above, Fourier transform spectrometers are well known in the art. Because the detector measures a modulated intensity, which is at all times very close to the average intensity, and this signal is Fourier Transformed to obtain the spectrum, these devices have a better signal to noise ratio than a dispersive system of comparable resolution. This advantageous feature is referred to as the multiplex advantage or Fellgett's advantage. Disadvantageously, most Fourier transform spectrometers require a moving scanning mirror within the interferometer which typically requires complex driving and control mechanisms which are generally expensive and give rise maintenance and reliability concerns.

Ironically, relative to a grating device, the scanning Michelson interferometer Fourier transform spectrometer can have a high etendue, (the area—solid angle product, which defines throughput), but the area over which the generation of the autocorrelation fringe is usable is small. For this reason scanning Michelson interferometer Fourier transform spectrometers are used extensively in the art today to make only single point measurements. Moreover, such Fourier transform spectrometers have received only limited deployment as imaging spectrometers, since most Fourier transform spectrometers image over only a relatively small solid angle, or object scene area.

Where an imaging Michelson interferometer Fourier transform spectrometer system is used, the data for the image "cube" is recorded as temporal slices of the two dimensional scene. Each temporal slice corresponds to a different scan mirror position, and the record of these for a given point in the scene is Fourier transformed to obtain the spectrum of that point. The use of the imaging Michelson interferometer Fourier transform spectrometer system does require scanning across a prescribed target area.

An alternative form of the Fourier transform imaging spectrometer is based on the Sagnac interferometer. Like the Michelson interferometer, the Sagnac interferometer uses a beamsplitter. Unlike the Michelson interferometer, however, the Sagnac interferometer uses a cyclic path with tilt angles introduced between the two beams to form spatial interference fringes, generating the spectral autocorrelation function. Light from a point source is collimated and passed through a Sagnac interferometer, producing a set of interference fringes on a plane in the output. These fringes can be shown to be autocorrelation fringes similar to those produced temporally by the scan mirror of the scanning Michelson interferometer. A linear detector array can sample this autocorrelation function, and the resulting signal, when Fourier transformed, yields the spectrum of the source.

When incorporated into an imaging spectrometer, the Sagnac interferometer is used in an anamorphic optical geometry. Light from a slit is collimated in a direction perpendicular to the slit, and allowed to form interference fringes in that direction perpendicular to the slit, over a rectangular detector array. In the other direction, the slit is re-imaged directly onto the array. Thus, one dimension of the array provides a spatial and the other, after being Fourier transformed, forms the spectrally dependent component of the data. Since each slice of the data cube corresponds to the set of points positioned at the slit, the slit is "pushbroomed", i.e. scanned perpendicular to the slits long axis in time to form the "cube".

The advantageous features of the Sagnac based imaging spectrometer are found in the cyclic interferometer. The most interesting property of the cyclic interferometer arises from the cyclic geometry of the device. Since both beams traverse a common path, both pathlengths are the same, and the device can readily form interference fringes in white light. More importantly, this device can be configured into a compact size at a relatively low cost. This makes this form of imaging spectrometer well suited for use in systems where size and weight are crucial. Less desirable, however, is the throughput of the device. Unlike A Michelson interferometer, the Sagnac interferometer requires a slit, and therefore, just like dispersive instruments, does not realize Fellgett's advantage which is normally inherent in Fourier transform spectrometers.

Another type of interferometer is a Mach-Zehnder interferometer. A Mach-Zehnder interferometer typically uses light from a coherent source that is split into two optical beams, by a first beamsplitter, and then recombined to interfere with one another by a second beamsplitter. In the common configuration for the Mach-Zehnder, each beam is reflected by one mirror before it is recombined by the second beamsplitter. As a result, it is possible to vary either the relative tilt or the relative path length difference of the recombined beams.

SUMMARY OF THE INVENTION

The present invention addresses the above-identified shortcomings in the field of imaging Fourier transform spectrometers through the utilization of an improved image plane interferometer coupled with the use of specialized image data processing routines to yield a high Etendue imaging Fourier transform spectrometer.

The present invention is a high etendue or throughput imaging Fourier transform spectrometer that has a resolution comparable to the best current devices, spectral coverage limited only by optical materials and detector response, and essentially no moving parts. The disclosed embodiment uses an image plane interferometer that is formed by including a second mirror to each beam path of a Mach-Zehnder interferometer. The additional mirrors add two more degrees of freedom such that both the tilt and path length for both beams can vary. In this manner, the image plane interferometer is designed such that the total path lengths for the two beams are the same, the two beams interfere at a prescribed tilt angle and oriented so that a prescribed reference point in the pupil of each beam can be made to coincide.

The described embodiment of the spectrometer is comprised of 1) image forming optical elements; 2) an interferometer, which provides two interfering images at the image plane, resulting in the spectral autocorrelation modulation of the scene image; 3) a CCD array camera to detect this interference modulated image; 4) a scanning mechanism to translate the image scene through the autocorrelation modulated image plane thereby allowing a sequence of the modulated scene images to be recorded; 5) a control system for operatively controlling the image forming optical elements, the scanning mechanism, CCD array camera, and interferometer; 6) an image data analyzer adapted for recording and processing the array data; and 7) data display and storage mediums.

The image forming optical elements of the present system are adapted for directing light from the object scene to an image focused at the image plane. The optical elements may be refractive or reflecting or a combination of both, and may include various relay lens elements. The described embodiment of the present imaging spectrometer also includes an iris which can control the amount of light sent to the image plane.

As briefly discussed above, the interferometer is an image plane interferometer which is comprised of a two-beam interferometer of various configurations which create two object scene wavefronts, converging to a focal plane, and tilted at a prescribed angle with respect to one another which, when superimposed, produce an interference pattern at the image plane of the imaging detector. The presently described imaging Fourier transform spectrometer utilizes an interferometer that includes a pair of beamsplitters and a plurality of mirrors to create the angled wavefronts which are then superimposed at the image plane of the imaging detector. The present spectrometer utilizes the interference created by the pair of angled wavefronts to encode the spectral information as an intensity modulation for each scene pixel in the image.

By recording the intensity variations of each scene pixel as the image is scanned along a row of the autocorrelation modulated image plane, it is possible to record the autocorrelation function of each pixel as a function of a stepped phase offset between the interfering wavefronts. Taking the Fourier transform of the intensity modulation signal of that scene pixel provides the spectrum associated with each scene pixel. It can be shown that the intensity modulation signal for each scene pixel in the interfering wavefronts in the image plane corresponds to the autocorrelation function of each pixel at a prescribed offset determined by the angle between the pair of wavefronts coupled with the position of the pixel on the image plane.

The disclosed embodiment of the imaging Fourier transform spectrometer also includes a standard imaging detector. The standard imaging detector is used to record the interference modulated scene generated at the image plane. This imaging detector is a discrete two dimensional array of detector elements which may be read out in a very short interval of time. Many individual frames of data are used to build up the autocorrelation record for each object scene pixel. This detector may be a charge coupled device (CCD) detector, having the advantages and features generally described in U.S. Pat. No. 4,976,542.

In order to build up a full spectral autocorrelation record, each object scene pixel must be scanned along a row of CCD pixels in the autocorrelation modulated image plane, and the intensity record made at each image plane pixel. This can be most easily accomplished if the object scene line of pixels is "scanned" from one detector pixel to the next along a row as each two dimensional image from the detector array is digitally transferred to memory. This can be accomplished in one of two ways. A continuous angular scan can be used, such that the angular scan rate is equal to the angular width of a pixel divided by the detector array readout interval. A continuous angular scan can be accomplished with an angular scan mirror or may exist naturally as a result of the spectrometer being used from a moving platform such as an aircraft or satellite. The alternate scanning technique is a "step and stare" scan. If a "step and stare" scan is used, the scan mirror must step the equivalent of one pixel for each successive readout interval of the camera.

The control system is operatively associated with the image forming optical elements, the scanning system, the CCD array, and the image plane interferometer. In the disclosed embodiment, the control system is adapted to start and stop data collection, to coordinate the timing of the scanning mechanism and CCD read cycles, and to provide for some measure of exposure control by opening or closing the iris based upon exposure levels derived from CCD output levels.

The image analyzer is adapted for processing the image data in a series of stages. First the raw CCD output data are collected and calibrated, i.e. normalized zero offset and gain on a pixel-by-pixel basis. This makes use of dark field and flat field calibration frames, as is a generally accepted practice in the art. Next the calibrated data array is processed into a record of the autocorrelation function aligned to each scene pixel. This autocorrelation function data is then re-arrayed into an image cube which has dimensions of x, y and phase offset. Finally each of these object scene autocorrelation records are Fourier Transformed to yield the final three dimensional data "cube" including two spatial dimensions and one spectral dimension. At each step of the data processing, the data arrays (i.e., data "cubes") are recorded into a data storage device. The resulting data from each pixel of the object scene corresponds to a record of its spectral content. Arrays of this data are transferred to a permanent storage medium such as a magnetic disk. A display medium, using digital graphics, is then used to display both current output as well as stored data.

The present invention can also be characterized as an apparatus for determining spectrum associated with radiation received from a target which includes an image plane together with an interferometer that generates first and second wavefronts oriented at an angle with respect to one another. Each of the two wavefronts having an image associated with the target with a broadband spectrum range and traveling a pathlength from the target to the image plane that substantially equal (i.e. within the coherence length). The first and second wavefronts are then superimposed in the image plane to generate an interference pattern which is detected using an optical detector. The optical detector includes a pixel that is oriented in the plane of the image plane and that generates signals representing the intensity of radiation collected by each array pixel. The measured intensity of radiation in the interference pattern as a function of time corresponds to an autocorrelation function which is Fourier transformed to yield the spectrum associated with the radiation.

The present invention can be further characterized as a method of optically imaging an object scene by determining the spectral content of each scene pixel of an object scene. The preferred method of optically imaging an object scene uses the disclosed image plane interferometer geometry which incorporates the ability to measure the autocorrelation function of each of the points or scene pixels of the object scene. The recording of this autocorrelation function information for each object scene pixel and subsequent Fourier transform thereof allows the spectrum of each scene pixel to be calculated.

The steps involved in the preferred method of optically imaging includes forming an image of the object scene upon a detector array with an objective lens. The detector array is situated at the image plane defined by the x and y axes of the coordinate system. Interposed between the objective lens and the detector array, along the z axis, is an image plane interferometer. The image plane interferometer creates a pair of scene image wavefronts, W(x,y) and W'(x,y), which are tilted at an angle θ with respect to each other about the y axis of the image plane. This tilt angle, θ, causes a linear varying phase offset, φ(x) between the two scene image wavefronts. As the two scene image wavefronts interfere, they do so with the fixed phase offset, such that the intensity function is represented as:

$$I = W(x,y) * W'(x,y) e^{i\phi(x)}$$

which is referred to as the autocorrelation modulation of the object scene at the image plane. It is important to note that this autocorrelation modulation is fixed with respect to the CCD array because of the fixed geometry of the objective lens, image plane interferometer, and CCD array.

An important aspect of the present imaging Fourier transform spectrometer is the high Etendue. The term "Etendue" is a French optical term for the area—solid angle product of an optical system, which defines the throughput, and the ultimate signal to noise ratio of the system. Advantageously, the present invention operates with a full image of the object scene on the array camera, nearly the same as a simple camera. The image plane interferometer provides only a modulation of the light reaching the image plane, with an average image intensity of approximately one half that of a regular camera.

Unlike prior art imaging spectrometers that image a line of point sources or a slice of the object scene and which therefore must be scanned to obtain the desired field of view, the present spectrometer images an entire target area simultaneously. At the same time the device is providing substantially more throughput, spectral resolution can be comparable to the best Fourier transform imaging spectrometer devices.

Another advantage of the presently disclosed imaging Fourier transform spectrometer is the high resolution capability. The spectral resolution of the system is defined by spatial sampling interval of the imaging detector, its band of spectral response, the relative angle of the two interfering beams, and fringe vignetting caused by the interaction of depth of focus and coherence. Unlike prior art imaging spectrometers, it is not limited by filter fabrication details, overlapping spectral orders of gratings, or absorption of dispersive elements in thick sections.

Yet another advantage of the present imaging Fourier transform spectrometer is that is well suited for operational use in the ultra-violet, visual, and infra-red optical regions. Since the device utilizes only a lens, relay optics, beamsplitters, mirrors and detectors, it can be built for any spectral region for which these optical elements can be fabricated. More importantly, the present imaging Fourier transform spectrometer can be incorporated into a very compact, relatively inexpensive design.

Still further, since the autocorrelation modulation is stationary with respect to the image plane, the imaging Fourier transform spectrometer disclosed herein has essentially no moving parts. A mechanical scan mirror may be required for certain applications other than airborne or spaceborne missions, where the motion of the platform over the ground may not be adequate to provide a scan of the object scene. Notwithstanding the possible use of a scan mirror, the present imaging Fourier Transform spectrometer does not require moving parts in order to generate autocorrelation fringes.

BRIEF DESCRIPTION OF THE DRAWINGS

The above and other aspects, features, and advantages of the present invention will become more apparent from the following, more detailed description presented in conjunction with the accompanying drawings in which:

FIG. 2 is a functional block diagram of the image data analyzer of FIG. 1;

FIG. 3a is a view depicting the geometry of a scan mirror for scanning the object scene in ψ, parallel to the x-axis of the CCD array camera;

FIG. 3b is a graphical representation of a continuous angular scan, with the slope of the scan equal to the angular separation of pixels at the image plane divided by the CCD array integration and readout time interval;

FIG. 3c is a graphical representation of a "step and stare" scan;

FIGS. 4a and 4b are schematic views of the optics arrangement in a conventional Mach-Zehnder interferometer showing pencil beams, two beamsplitter mirrors and two flat fold mirrors;

FIGS. 5a and 5b show interference patterns produced by broad collimated beams of HeNe light and white light using the conventional Mach-Zehnder interferometer;

FIGS. 6a and 6b depict interference fringe spacing as a function of the inclination angle, θ;

FIG. 7a depicts the noninterference of beams with small diffraction patterns and no overlap whereas FIG. 7b depicts the interference of large diffraction patterns with overlap;

FIGS. 15a and 15b illustrate a temporal record of successive CCD array frames and the array or cubes of output data associated with the present imaging Fourier transform spectrometer, respectively;

Throughout the specification and various views of the drawings, like components are referred to with like reference numerals.

DESCRIPTION OF THE PREFERRED EMBODIMENTS

The following description is of the best mode presently contemplated for carrying out the invention. This description is not to be taken in a limiting sense, but is made merely for the purpose of describing the general principles of the invention. The scope of the invention should be determined with reference to the claims.

Figure 1:
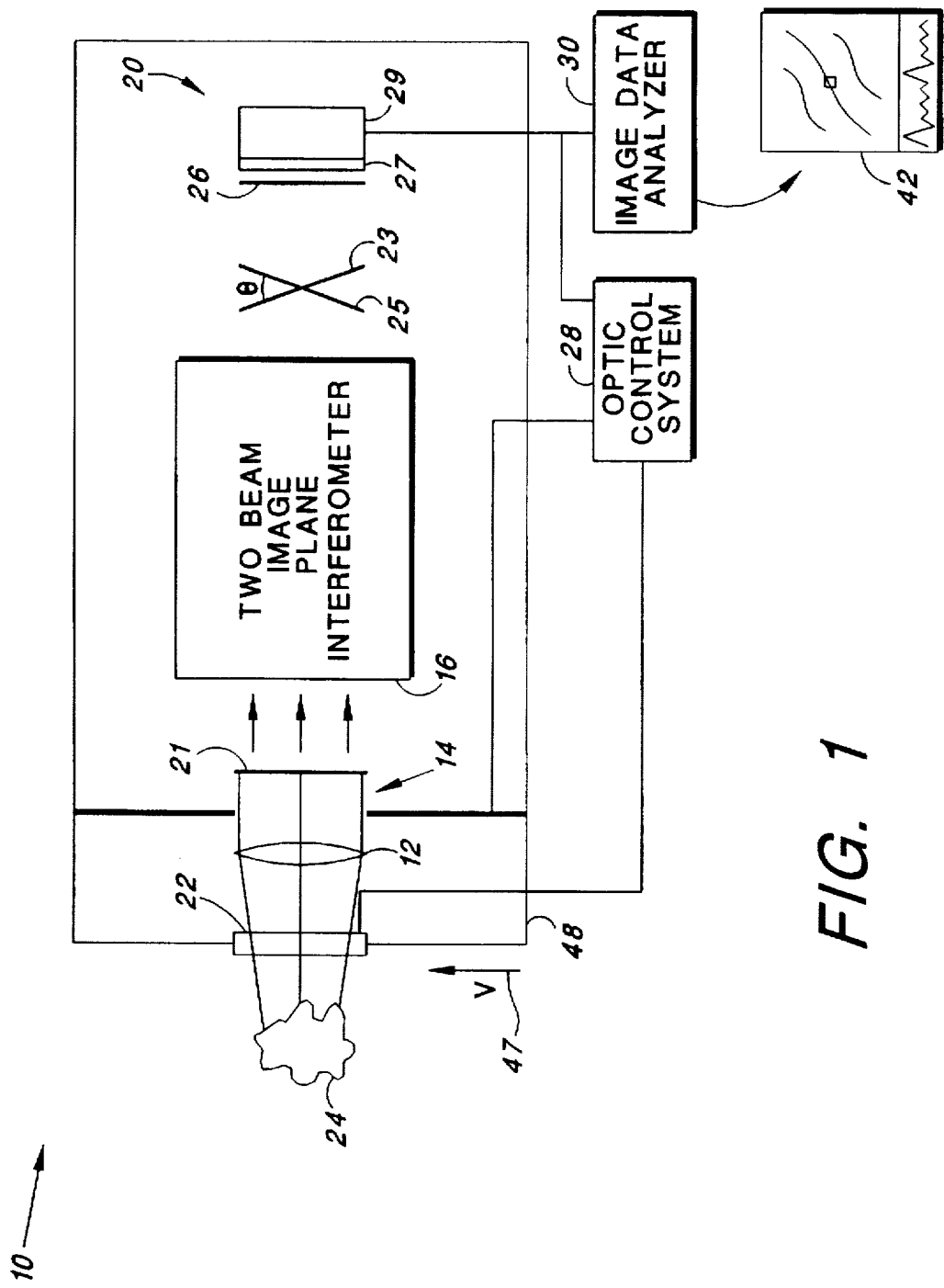
FIG. 1 is a schematic representation of the imaging Fourier transform spectrometer in accordance with the present invention.

Referring now to the drawings, and particularly FIG. 1, there is shown a schematic representation of the present imaging Fourier transform spectrometer 10. The illustrated imaging spectrometer includes a lens 12, an iris 14, a two-beam interferometer 16, a charge coupled device (CCD) array camera 20, a scan mechanism 22, an optic control system 28, and an image data analyzer 30 in the form hardware and software for the calibration, processing, Fourier transform, display, and storage of spectral image data arrays.

The lens 12 images light or other electromagnetic radiation received from an object scene 24 creating an object reference wavefront 21 which passes through the two beam interferometer 16 and onto the area of the imaging CCD array camera 20. The iris 14 is adapted for controlling the amount of light received from the object scene 24 that is to be imaged.

The two-beam interferometer 16 is interposed between the imaging lens 12 and the image plane 26. The interferometer 16 is adapted to split the reference wavefront 21 going to focus at the image plane 26 into two separate beams 23, 25 of light converging on the image plane 26, causing them to interfere at the image plane 26. The particular embodiment of the two beam interferometer 16 which has been developed is referred to as an image plane interferometer 16. An image plane interferometer 16 has several special properties, which are discussed in more detail below.

The CCD array camera 20 detects and records the intensity pattern of the interfering wavefronts 23, 25 at the image plane 26. The CCD array camera 20 includes a CCD array 27, and appropriate electronics 29 required to record the intensity modulation of each scene pixel imaged in the CCD array 27 as each pixel moves across the image plane 26.

As shown in FIGS. 1 and 2, the imaging spectrometer also includes the hardware and software in the form of an image analyzer 30 that is adapted to process and analyze the image data. The processing and analysis include: collecting the raw CCD array intensity data 32; calibrating the raw CCD array intensity data 34 to produce calibrated image data 35; array processing 36 the calibrated image data 35 to generate an image "cube" of autocorrelation data 38 for each scene pixel; Fourier transform processing 40 of the autocorrelation data 38 to convert the "cube" of autocorrelation data 38 to an image "cube" of spectral data 41. The digital hardware and software within the present image data analyzer 30 also includes the elements necessary to output 39 the spectral data 41 in a display 42 as well as archive the various forms of the data in various storage media 43. Most of the above described hardware and software is of a form that is well known in the art.

Referring back to the embodiment illustrated in FIG. 1, the scan mechanism 22 is actually provided by the motion (shown as arrow 47) of an airborne or satellite platform 48, providing the object scene 24 with a relative velocity, v, across the CCD array camera 20. FIG. 3a depicts an alternate form of scan mechanisms 22 which can be used in conjunction with an imaging spectrometer disposed on a stationary platforms. This alternate form of scan mechanism 22 includes a scan mirror 50 in the near field of the objective lens 12 which is rotated about an axis 52 perpendicular to the relative motion of the object scene 54 in the image plane. Two forms of scan are acceptable, one of which is a continuous angular velocity scan, as graphically illustrated in FIG. 3b. The other form is a "step and stare" scan in which the scan mirror 50 is stationary during each CCD array 20 integration period, $\Delta t$, and moving to the next position during the CCD array 20 frame transfer interval. The "step and stare" scan is graphically illustrated in FIG. 3c.

Also shown in FIGS. 1 and 2 are the control features of the system. The optic control system 28 is adapted to operatively control the elements of the imaging spectrometer 10. For example, in the illustrated embodiments, the optic control system 28 is adapted to control the image data analyzer 30 for the collection and processing of data, control the timing for the scan mechanism 22 and CCD array camera 20 readout, and to control the iris 14 exposure. Although the illustrated embodiments use an optically fixed interferometer, it is contemplated that, for an appropriate design, one may operatively associate the control system with the image plane interferometer.

As mentioned earlier, there are several unique attributes of the presently disclosed image plane interferometer 16. In general, the image plane interferometer 16 is a two beam interferometer which operates on light converging to a focus. The light paths for both imaged wavefronts 23, 25 within the image plane interferometer 16 are of equal length, however, the imaged wavefronts 23, 25 are tilted at a prescribed angle θ, while discreet image points of the tilted wavefronts are co-located such that lateral coherence requirements are met, resulting in an interference pattern.

To aid in the understanding of the unique properties of the present image plane interferometer 16, it is helpful to describe the configuration of the image plane interferometer 16 relative to various prior art interferometers such that those familiar with the art can understand and appreciate the advancement in the art. To that end, a common form of the prior art Mach-Zehnder interferometer 60 is shown in FIGS. 4a and 4b. To avoid dispersion effects, both beams 62, 64 must pass through the beamsplitters 65, 66 at the same angle. As shown in FIGS. 4a, if the relative path length for the two interfering beams 62, 64 to be equal, ($P_1=P_2$) the relative angle at which the two wavefronts interfere, must be zero. Conversely, as shown in FIG. 4b, if the relative path lengths for the two interfering beams 62, 64 are different, the resulting wavefronts may be oriented at an angle θ with respect to one another.

As depicted in FIG. 5a, a coherent wavefront 67 from a HeNe laser source 68 can be split by a Mach-Zehnder interferometer 60 having different path lengths so as to produce two beams of light 62, 64 with wavefronts 61, 63 which are tilted with respect to one another. When the two coherent light beams 62, 64 are recombined, they interfere, producing a field of uniform interference fringes. The interference pattern 69 is present even if the relative path difference ($P_1-P_2$) is substantial because HeNe laser light has a longitudinal (z axis or propagation axis) coherence length of many meters. If one makes the two paths of the Mach-Zehnder interferometer 60 of exactly equal length ($P_1=P_2$) as shown in FIG. 5b, even a source of white light, which is normally not thought of as coherent, interferes, producing what is referred to as a "white light interference fringe" 72.

In order to form interference fringes, light must possess lateral coherence as well as longitudinal coherence. Therefore, in order to have interference in the image plane of the present device the two beams must be positioned within their lateral coherence lengths.

The longitudinal coherence length of "white light", (0.4 to 0.7 micron light), is only several wavelengths, and this coherence length, is reflected in the interference pattern 72, which is only several "wiggles" wide. The longitudinal coherence length is proportional to the length of the "envelope" of the autocorrelation function of the light. Mathematically, any signal has a spectrum, and the spectrum is the Fourier transform of the autocorrelation function for the signal. The HeNe laser light which has an extremely narrow spectrum, has a long coherence length and autocorrelation function, while white light which has a relatively broad spectrum has a proportionately narrow autocorrelation function and coherence length.

Note that, as is shown in FIGS. 6a and 6b, the spatial frequency of the interference fringe 75a, 75b is inversely proportional to the angle, θ, between the interfering wavefronts 77a, 79a and 77b, 79b. Since ultimately there is a need to record the fluctuations of the fringes with a CCD array of finite element spacing, it is necessary to control the angle, θ, so that the minimum spatial frequency of the interference fringes is greater than twice the spatial frequency of the sampling, (i.e., CCD array element spacing). This is known to those familiar in the art to be the Nyquist sampling criteria.

Consider for the moment, an attempt to make an image plane interferometer from an equal path Mach-Zehnder interferometer. As illustrated, the Mach-Zehnder interferometer of FIGS. 7a and 7b include a pair of beamsplitters, 85, 87 together with two mirrors 81, 83. By positioning a lens 80 with a large aperture 90 in front of the interferometer 82 as shown in FIG. 7a, the image of a point source 84 would yield two spots or images 86, 88 which would not overlap, and therefore would not interfere. If the aperture 90 associated with the lens 80 is extremely small, i.e., low throughout, as shown in FIG. 7b, using diffraction to overlap the images, one would find that the two broad diffraction pattern images 89, 90 would interfere but the throughout is very low. Instead, however, by adding another pair of mirrors 91, 93 to the interferometer 82, as shown in FIG. 8, it is possible to simultaneously overlap the two small diffraction images 95, 97 while maintaining a zero common path difference ($P_1=P_2$), and produce the desired wavefront tilt, θ, at the same time.

Figures 9A, 9B:
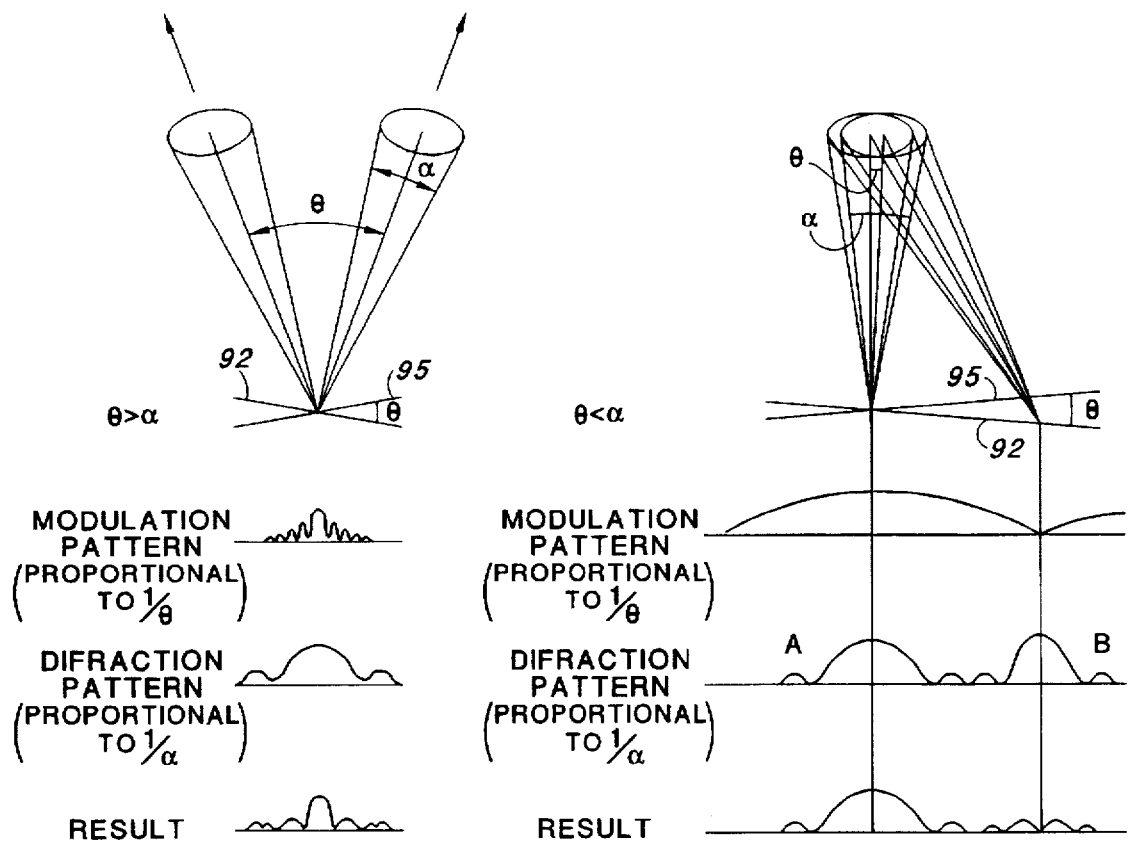
FIGS. 9a and 9b depict two cases where the pupils of the two interfering beams appear to be widely separated, and closely overlapped, respectively.

It is important to note, however, that if the two tilted wavefronts 92, 95 are separated by more of an angle, θ, than the angle, α, of the apparent source apertures, as shown in FIG. 9a, the fringes produced are narrower than the diffraction pattern of the point source. On the other hand, if the tilt angle, θ, is only a small fraction of the angle, α, of the apparent source apertures, the interference fringes are much broader than the diffraction pattern, and would not be seen. This is shown in FIG. 9b. Note that another object point, at a non-central angle, might fall in the general region of a null. If the system is properly aligned, it becomes apparent that the "modulation" is an artifact of the interferometer and lens geometry, and does not depend on the particular source point.

Figure 8:
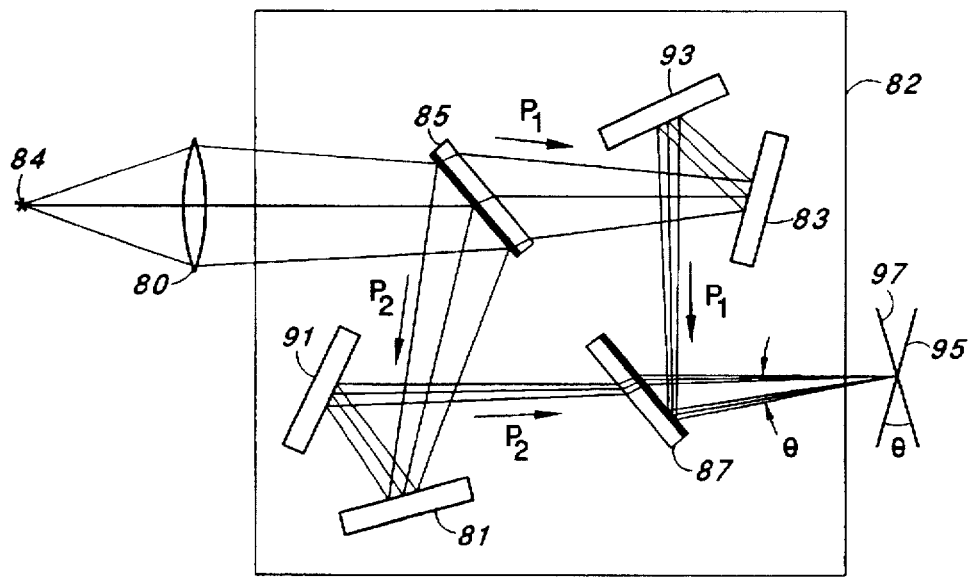
FIG. 8 depicts an embodiment of the two beamsplitter and four mirror image plane interferometer of FIG. 1 which produces two tilted wavefronts such that the image points coincide at the image plane.
Figure 10A:
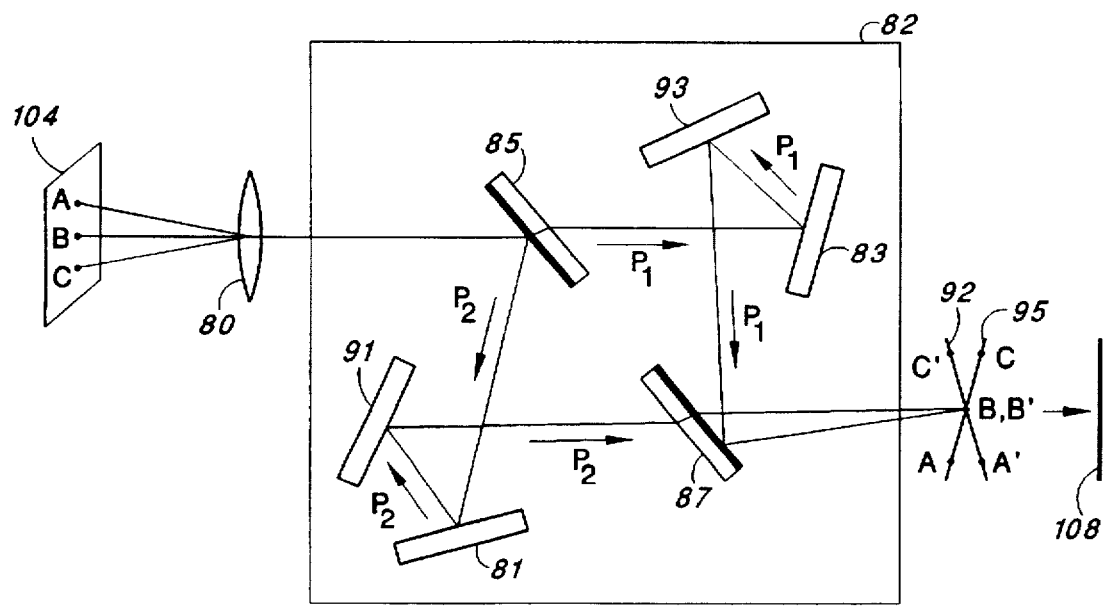
FIG. 10a depicts the wavefronts of three arbitrary points, A, B, and C as they would come to focus after emerging from the two beam image plane interferometer of FIG. 8.
Figure 10B:
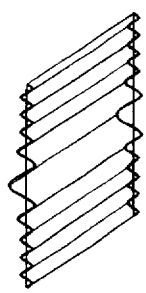
FIG. 10b is a graphical representation of the modulation which would appear in the image plane of the spectrometer of FIG. 10a for an object scene of uniform spatial distribution of white light.

Using the same optic geometry as shown in FIG. 8; one can expand the object scene from a point source 84 (as seen in FIG. 8) to a collection of point sources, or even a continuum as shown in FIG. 10a. If each point (A, B, C) in the object scene 104 is imaged by both paths $P_1$ and $P_2$ in an image plane interferometer 82, to within the lateral coherence length in the image plane 108, then interference fringes are present. If the object scene area is a white object scene area, then the whole image plane displays a white light fringe similar to that shown in FIG. 10b. This is true if, and only if, the image points A, B and C, corresponding to any arbitrary source points from one beam 95 of the interferometer 82, are re-imaged to within a lateral coherence width of points A', B' and C' of the other beam 92.

Figure 11:
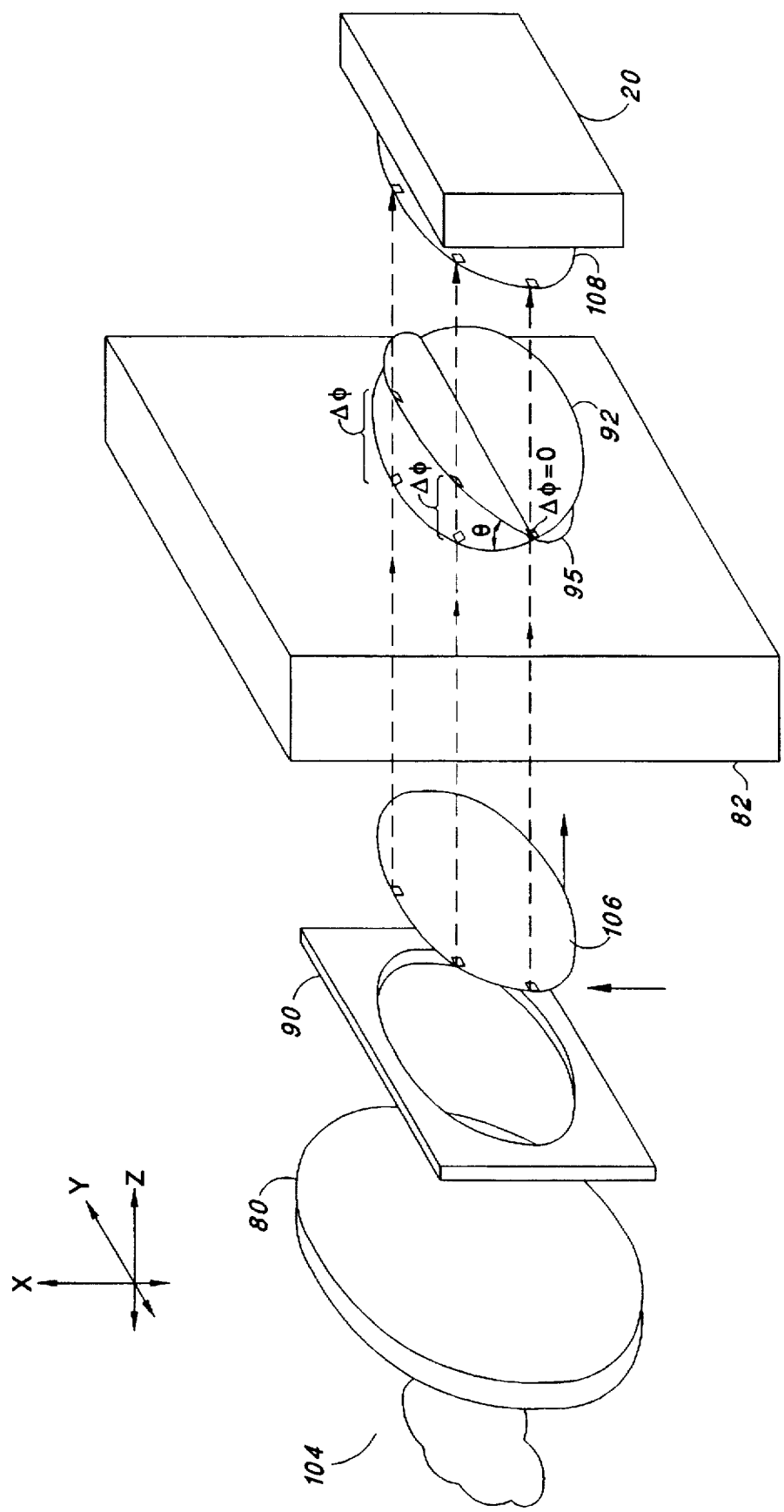
FIG. 11 is another view of the imaging Fourier transform spectrometer of FIG. 1 depicting "reference" wavefronts for various field points as the light propagates through the spectrometer to the image plane.

FIG. 11 is an illustration that depicts the optical interferometry aspects of the present invention. In order to simplify this discussion as much as possible, imagine that the light from the object scene 104 was shuttered at the aperture 90 for a for very small interval of time. An interval corresponding to much less than a wavelength at the speed of light. Further imagine that the angular extent of this imaginary wavefront (reference wavefront) 106 is limited to only the center of the imaging lens 80.

As seen in FIG. 11, the reference wavefront 106 is shown entering the image plane interferometer 82 in the z direction. As discussed above, the image plane interferometer 82 utilizes a pair of beamsplitters and various mirrors to split the light into two wavefronts 92, 95 are oriented at a prescribed angle, θ, with respect to one another. Also, the two beams come to focus coincidentally, at the image plans such that the lateral coherence requirements are met and interference fringes are produced. As shown in the drawings, the image plane 108 is disposed in a generally parallel orientation to the reference wavefront. The phase relationship or offset, Δφ, between the two tilted wavefronts 92, 95, at the image plane 108 in the illustrated embodiment is caused by the tilt angle, θ, and thus varies linearly in the x direction.

Figure 12:
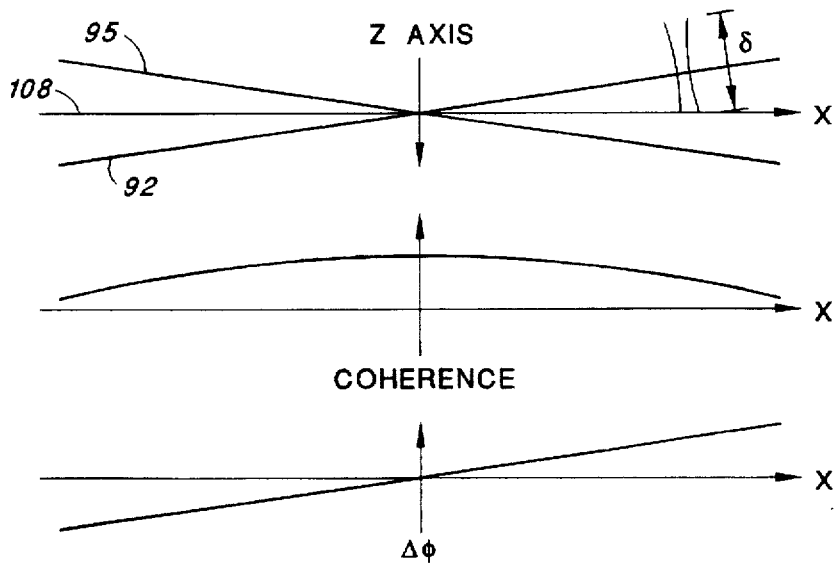
FIG. 12 depicts the apodized envelope of autocorrelation fringes due to coherence loss associated with depth of focus.

As shown in FIG. 12, there should eventually be a dissipation of coherence with large phase offset, due to the depth of focus of the optical system. Commonly, the depth of focus of an optical system is related to the geometry of the optical system, namely:

$$\delta = \lambda \times (f/no)^2$$

where δ is the depth of focus, λ is the wavelength, and (f/no) is the focal ratio of the system which is equal to the focal length of the optical system divided by the aperture diameter.

It is expected that when the phase offset, Δφ, is of the same length as the depth of focus, δ, there is a gradual decrease in coherence between the two wavefronts and interference fringes diminish in amplitude. This causes a form of apodization to the interference wavefront, which in turn impose limitations to the spectral resolution of the system. These processes are generally understood by those knowledgeable in the art of Fourier transform spectroscopy.

Referring back to FIG. 11, the image plane interferometer is situated on the z axis, between the objective lens and the image plane. The objective lens forms an image of the object scene upon an M×N CCD array which is situated proximate the image plane, defined by the x and y axis of the coordinate system. The image plane interferometer is adapted to create a pair of scene image wavefronts, W(x,y) and W'(x,y), which are tilted at an angle, θ, with respect to each other about the y axis of the image plane. This tilt angle, θ, causes a linear varying phase offset, φ(x), between the two scene image wavefronts.

As indicated above, the corresponding pixels of the coherent wavefronts interfere with one another at the image plane to create an interference wavefront pattern. Since each pixel is uniquely identified by a set of {x,y} coordinates, the resulting interference pattern of the two coherent wavefronts 92, 95 causes the intensity of each pixel in the recorded image to also be a function of the {x,y} coordinates. As the two scene image wavefronts interfere, they do so with the fixed phase offset, such that the intensity is governed by the following relationship:

$$I(x,y) = W(x,y) \cdot W'(x,y) e^{i\phi(x)}$$

For a specified function, f(t), the autocorrelation function is the average value of the product of [f(t)*f(t−τ)], where τ is an offset or time-delay parameter. In the present embodiment, the function of concern is the optical energy in each pixel of the coherent wavefronts in the interferometer and the autocorrelation function of the optical energy of each pixel of the wavefronts is equal to the intensity modulation of the superimposed wavefront image, I(x,y), as in the following equation:

$$I(x,y) = A(x,y,p_1) \cdot A'(x,y,p_2); \text{ and}$$

$$A(x,y,p_1) \cdot A'(x,y,p_2) = A(x,y,p) \cdot A'(x,y,p-\phi) = I(x,y,\phi)$$

where $p_1$ and $p_2$ represent the respective path lengths in the two-beam image plane interferometer and $A(x,y,p_1)$, $A'(x,y,p_2)$ are the autocorrelation functions of the wavefronts. This is referred to as the autocorrelation modulation of the object scene at the image plane. Note that the autocorrelation modulation is fixed with respect to the CCD array by the fixed geometry of the objective lens, interferometer, and CCD array.

The CCD array is placed in a stationary position with respect to the imaging plane 108 such that the each point on the CCD array corresponds to a physical pixel in the interference pattern. As a target moves across the target area at a prescribed velocity, v, the resulting scene is "pushbroomed" across the CCD array at the same velocity. The relative velocity, v, at which the object moves across the target area and at which the imaged scene moves across the CCD array corresponds to a shift of the scene by one physical pixel during each readout time interval, Δt, of the CCD array. In other words, the velocity of the imaged scene is such that a physical pixel of the interference wavefront moves from a given point on the CCD array to an adjacent point in the CCD array during each readout time interval, Δt. If the movement of the imaged scene or target were limited to the x direction, the position of a physical pixel in the imaged scene across the CCD array becomes a function of time. The change in position, x(t) is represented by the following equation:

$$X_t = X_{t-1} + V\Delta t, \text{ or}$$

$$\Delta x = v \Delta t$$

Figure 13B:
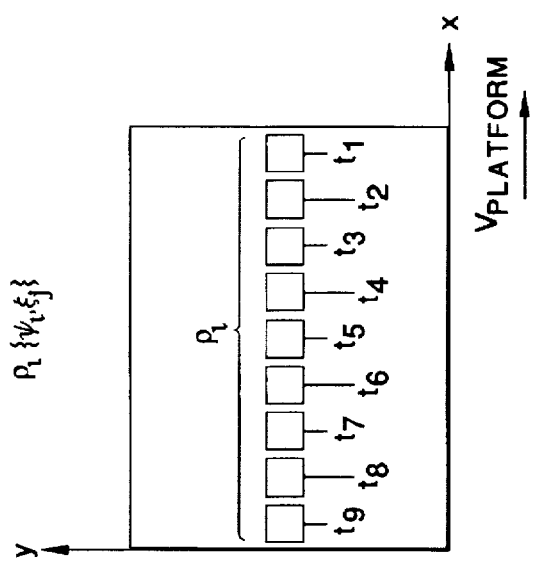
FIG. 13b depicts the position of an individual object scene pixel in a sequence of CCD array readouts and further illustrating that while the scene pixel is being "pushbroomed" across the CCD array it is also being modulated by the interference field, producing an autocorrelation function intensity history.
Figure 13A:
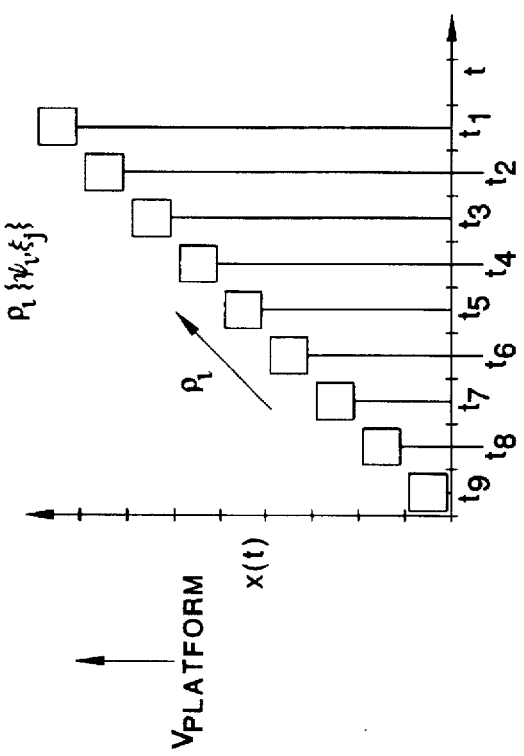
FIG. 13a is a graphical representation of the movement of an individual object scene pixel across the image plane of the spectrometer.

In operation, the intensity modulation of a given pixel in the interference wavefront over time is easily recorded because of the prescribed relationship between the velocity of the imaged scene and the CCD array readout time interval. One may recall that, the velocity of the imaged scene is such that a physical pixel of the interference wavefront moves from a given point on the CCD array to an adjacent point in the CCD array during each readout time interval. FIG. 13a is a graphical representation of the movement of a physical pixel as a function of time whereas FIG. 13b shows the movement of a physical pixel across the CCD array. As illustrated, a single pixel of the imaged scene is recorded as a function of time as it moves from one point in the CCD array to an adjacent point in the CCD array. If the CCD array is a N by M array, as shown in FIG. 13b, the time history of the intensity of pixel, $p_1$, consists of N discrete CCD array readings. More importantly, the time history of the intensity of the single pixel, $p_1$, of the imaged scene corresponds exactly to the autocorrelation function of the spectral content for that pixel, as would be recorded by a Michelson interferometer as the offset mirror is scanned.

Figure 14B:
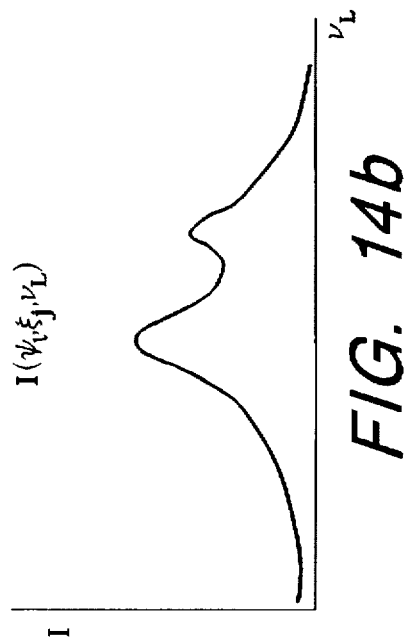
FIG. 14b is a graphical representation of the Fourier transform of FIG. 13a which yields the spectrum of an object scene pixel.
Figure 14A:
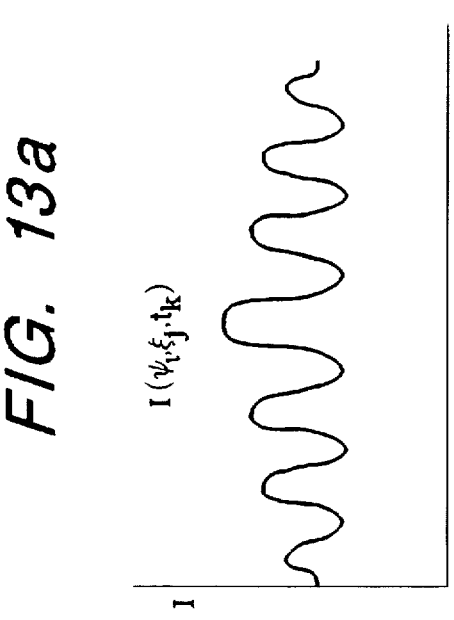
FIG. 14a is a graphical representation of the autocorrelation function intensity as a function of time for an arbitrarily colored object scene pixel as recorded by the CCD array.

Turning now to FIG. 14a, there is shown a graphical representation of the intensity as a function of time for an individual pixel as recorded by the CCD array. As a particular scene is "pushbroomed" or otherwise moved across the image plane, the recorded intensity of each pixel at a particular set of coordinates is a function of time. FIG. 14b shows a graphical representation of the Fourier Transform of the pixel intensity which provides the spectrum of that pixel.

Figure 15A:
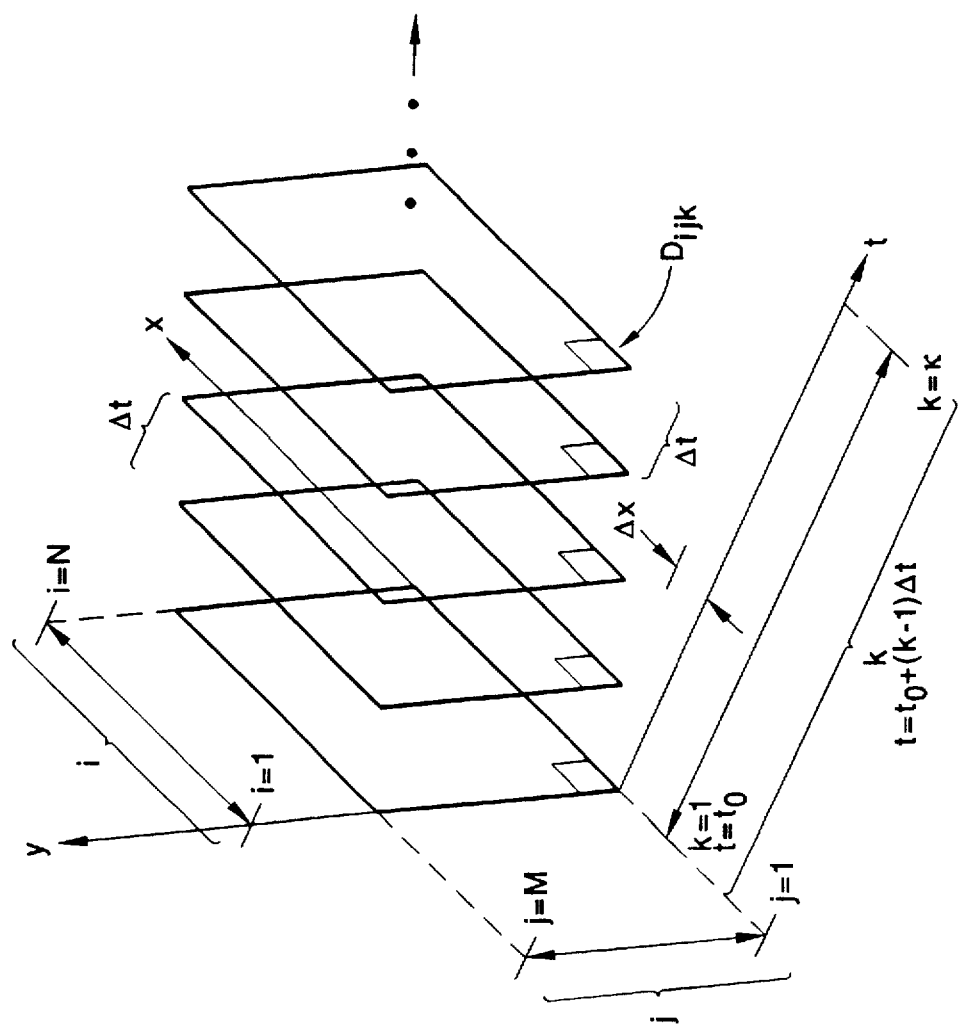

The CCD detector and a temporal record of successive CCD frames is shown in FIG. 15a. Detector elements $D_{ij}$ are indexed in x, from i=1 to N, and in y, from j=1 to M. Images are indexed in k, and starting at a time $t=t_0$ for k=1, the detector is readout at each time interval, $\Delta t$, such that the $k^{th}$ readout occurs at the time corresponding to $t=t_0+(k-1)\Delta t$. Detector element record $D_{ijk}$, refers to the $k^{th}$ record at detector position $D_{ij}$. Note that k can be many times larger than N, forming a ribbon of spectral image data.

If an individual object scene point, $\rho$, is scanned across the autocorrelation modulated image plane along the x axis, the record of the intensity will correspond to the autocorrelation function of the wavefront, $I(\rho,\phi)$, as a function of the phase offset, $\phi$. If this autocorrelation function is Fourier transformed, the result will be a spectrum of the scene point, $S(\rho,\upsilon)$, not in wavelength space, $\lambda$, but in wavenumber space, $\upsilon$:

$$FT\{I(\rho,\phi)\}=S(\rho,\upsilon); \text{ and}$$

$$\underline{FT}\{S(\rho,\upsilon)\}=I(\rho,\phi)$$

One can generalize from this spectroscopy of the single scene point, $\rho$, to the entire array of object scene pixels, $\rho_{\eta\xi}$, imaged onto the CCD array. By requiring the image of each of these object scene pixels, $\rho_{\eta\xi}$, to be the same size on the image plane as the CCD array detectors, or pixels, $D_{ij}$. The object scene is "pushbroom" scanned across the CCD array such that an object scene point, $\rho_{\eta\xi}$, indexes one pixel of the CCD array in the x direction after each, $k^{th}$, readout of the CCD array. Again the length of the ribbon of swept image points can be many times larger than N. After K readouts of the CCD array, the data represents an array of output data, $D_{ijk}$, for i=1 to N, j=1 to M and k=1 to K, as shown in FIG. 15b.

The K images are then adjusted for zero offset and gain, a process which uses flat field and dark field data to calibrate each individual image. Next, the calibrated image data is array processed into the scene point Autocorrelation data cube, $I_p(\eta\xi\kappa)$, for $\eta=1$ to K−N+1, such that k=$\eta$+$\kappa$−1, for $\xi=1$ to M, such that $\xi$=j, and $\kappa$=1 to N, such that i=N−$\kappa$+1. Note that the index $\kappa$=1 to N, corresponds to integral $\lambda\phi$ phase steps in the phase of the two object scene wavefronts at $\rho_{\eta\xi}$. Finally, the Fourier transform of the K−N+1×M autocorrelation records of $I_p(\eta\xi\kappa)$, results in the K−N+1 $\lambda$x by M $\lambda$y by N $\lambda\upsilon$ spectral data array of $\rho_{\eta\xi}$ namely $S_\rho(\eta\xi\upsilon)$.

Figure 16:
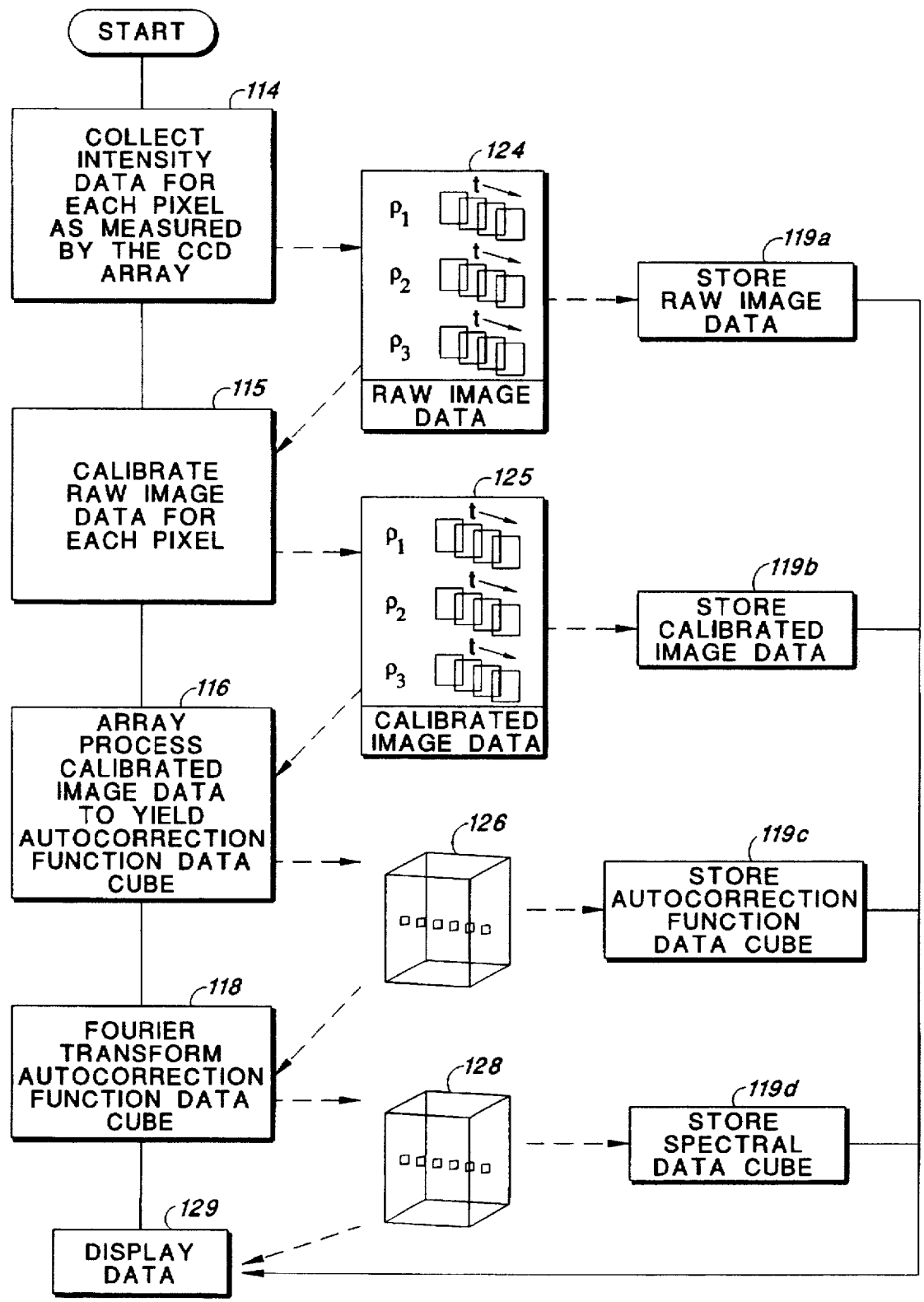
FIG. 16 shows a simplified block diagram of the data handling in the present imaging Fourier transform spectrometer.

Turning now to FIG. 16, there is shown a simplified functional block diagram of the data handling in the present imaging spectrometer with each separate function or step together with the data output at each step being represented by a separate block and corresponding reference numeral.

With the foregoing discussion in mind, consider the object scene being imaged to be merely a plurality of scene points, with each point, $\rho$, longitudinally aligned with a physical element in the CCD array. As an individual object scene point, $\rho$, is scanned across the image plane in a prescribed direction (i.e. along the x axis), the scene point, $\rho$, is moving from one CCD array element to an adjacent CCD array element for each CCD array readout interval, $\Delta t$. It has been established that the time history of the intensity of any given pixel resulting from the interference of the corresponding pixels in the two angled wavefronts exiting the image plane interferometer, equates to the autocorrelation function of the wavefront emanating from that scene point. The intensity of any given pixel over time is measured by the various CCD array elements. The CCD array elements, however, are measuring a plurality of scene points concurrently. Thus, intensity data for all scene points of the object scene are being measured concurrently.

Accordingly, the first step involved in the data handling routines associated with the present imaging spectrometer is to collect 114 the raw image data 124 representing the time history of the intensity as measured by the CCD array elements for each individual pixel (i.e. each individual scene point). As the raw image data 124 (i.e. intensity data) is being collected for each pixel, the data is calibrated 115. Calibration 115 involves normalizing the offset and gain on a pixel-by-pixel basis using dark field and flat field calibration data. The calibrated data 125 for each pixel over a prescribed period of time is then array processed 116 into an autocorrelation function data cube 126 that is aligned to each scene point or pixel. As indicated above, the autocorrelation function data cube 126 is presented in terms of $\psi_i$, $\xi_j$, and $t_k$, where $\psi_i$ and $\xi_j$ represent the time-independent position of a physical pixel at the scene-point. (Note the autocorrelation function data can then be re-arrayed into an autocorrelation function image cube which has dimensions of x, y and $\Delta\phi$).

Fourier transforming 118 the autocorrelation function image cube results in a spectral data array 128 of each scene point. As indicated above, the resulting spectral data array includes two spatial dimensions and one spectral dimension to yield a spectral data cube. At each processing step along the way, the data is stored (Refer to blocks 119a, 119b, 119c, and 119d) for later retrieval and/or display 129 in a graphical format.

Figure 17:
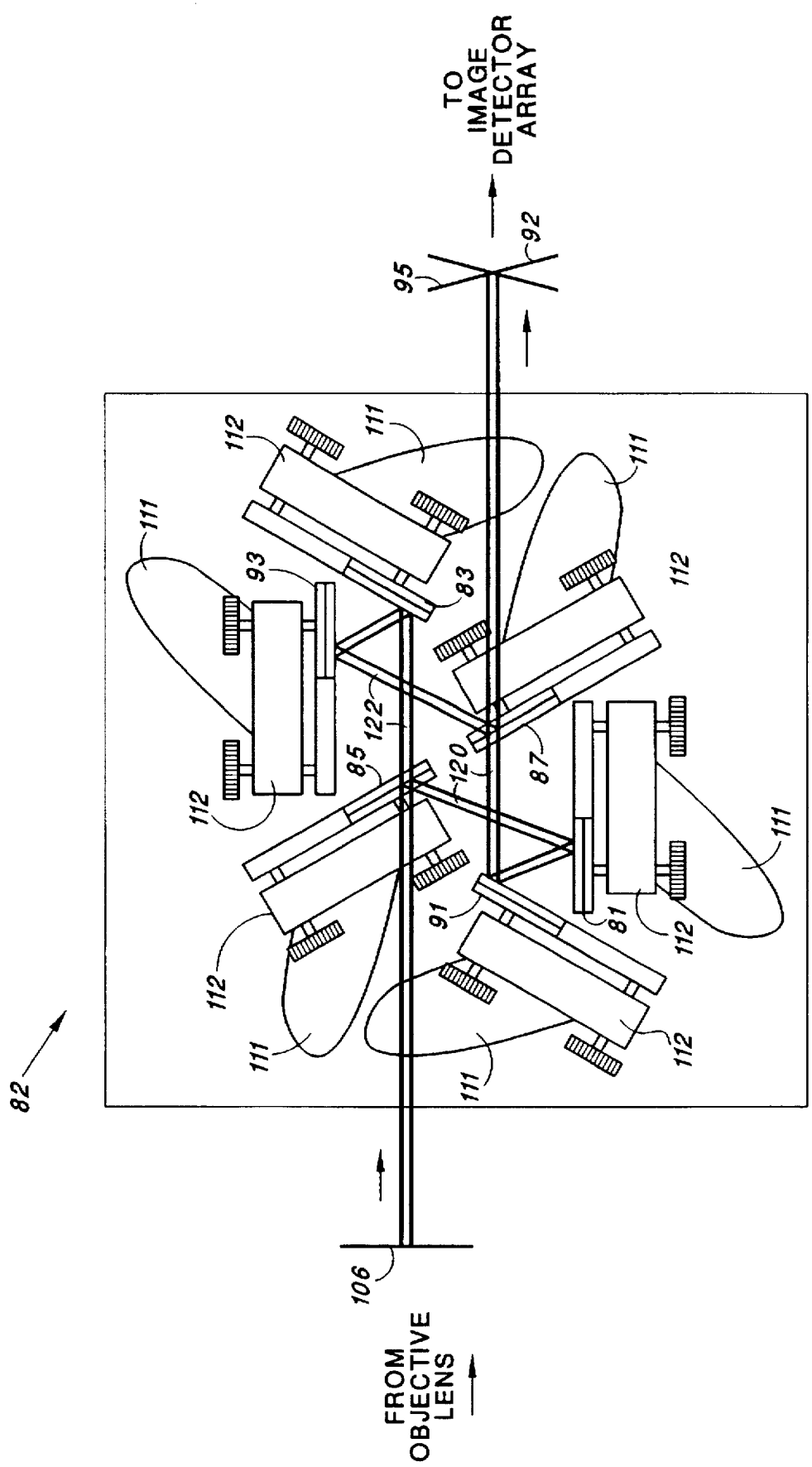
FIG. 17 is a view of the optical layout of the two beam image plane interferometer of FIG. 8, showing how the two beamsplitter and four fold mirrors are mounted in optical mounts.

Turning now to FIG. 17, the basic optics arrangement of the two beam, image plane interferometer 82 in one embodiment of the invention is shown. The illustrated interferometer 82 includes a base 110, two beamsplitters 85, 87, four mirrors 81, 83, 91, 93, and a plurality of mounts 111. In addition, each of the beamsplitters and mirrors have various adjustment and alignment mechanisms 112 to facilitate the optical positioning of the various components. The illustrated image plane interferometer 82 is adapted to receive a image wavefront 106 from the objective lens (not shown) and produce a pair of identical wavefronts 92, 95 oriented at an angle, $\theta$, with respect to one another, which come to a coincident focus on the image plane (not shown).

Specifically, the interferometer 82 receives an object scene wavefront 106 through the objective lens which, without the interferometer would focus the received radiation into a converging wavefront which would come to focus at the image plane located proximate an image detector array. When the object scene wavefront 106 passes through a first beamsplitter 85 the wavefront is divided into two wavefronts. A first portion of the object scene wavefront is reflected by the beamsplitter 85 and is represented as wavefront 120 where it is further reflected from a first mirror 81 to a second mirror 91 where it is again reflected before passing through a second beamsplitter 87 along a designated optical path. A second portion of the object scene wavefront is transmitted through the first beamsplitter 85 and is represented as wavefront 122 where it is further reflected from a third mirror 83 to a fourth mirror 93 and back to the second beamsplitter 87 along reflecting into a slightly different optical path from wavefront 120. Thus, the first beamsplitter 85 serves to separate or split the target wavefront into two wavefronts 120, 122 that traverse separate paths. As each separate wavefront 120, 122 traverses it's separate path, the mirrors 81, 83, 91, 93 along each path cause the separate wavefronts 120, 122 to become tilted or angled relative to one another in a manner known to those persons skilled in the art. The second beamsplitter 87 serves to recombine the wavefronts 120, 122 forming a pair if angled wavefronts 92, 95 which are directed to the imaging detector array, (i.e. CCD array camera). At the image plane, preferably at the imaging detector array, the two angled wavefronts come to a coincident focus, thereby creating an interference pattern with fringes. This recombined scene wavefront is referred to as the interference wavefront whose intensity is modulated in a form that is indicative of the spectral content of the incoming radiation.

Figure 18A:
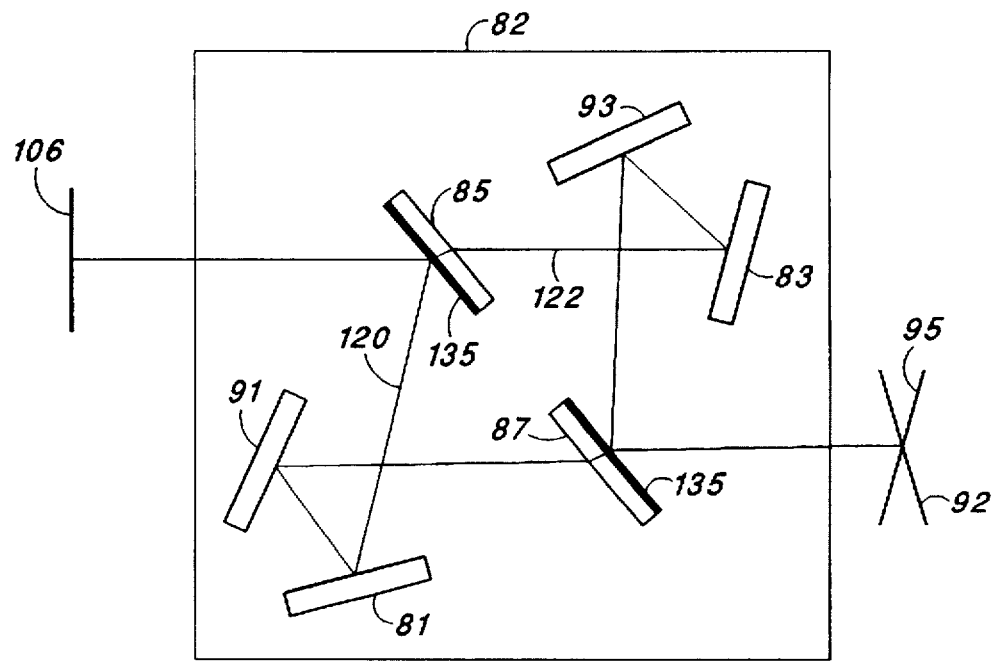
FIGS. 18a and 18b depict alternate flat mirror geometries for the two beam image plane interferometer of FIG. 8.
Figure 18B:
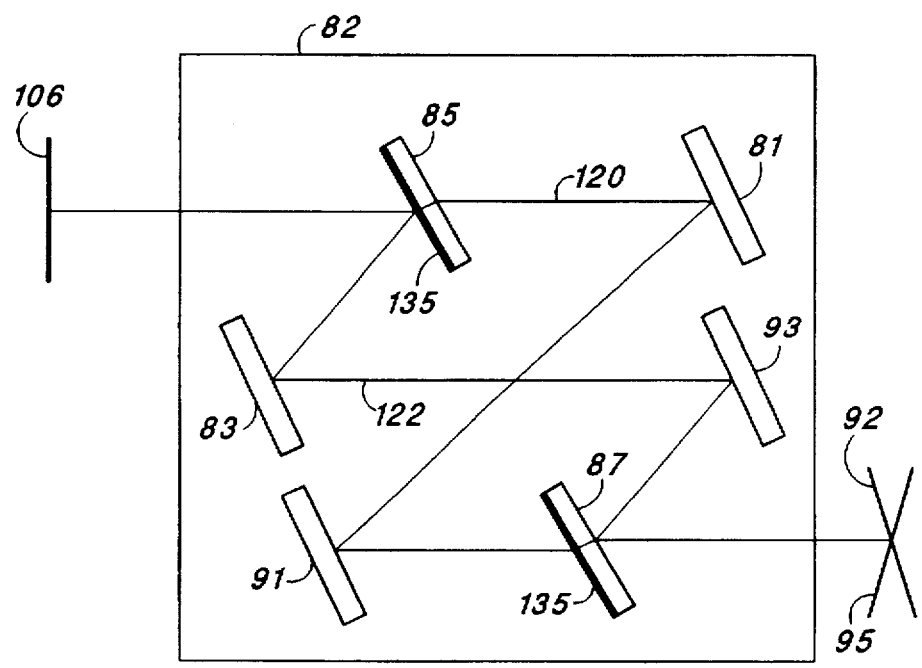

FIG. 18a and FIG. 18b depicts several alternative embodiments of the optic elements within the image plane interferometer 82 used in the present imaging Fourier transform spectrometer. FIG. 18a and FIG. 18b show two forms of two beam image plane interferometers 82 which use a pair of beamsplitter plates having the beamsplitter coating 135 on one side thereof and a plurality of mirrors. As seen in FIG. 18a, the incoming wavefront 106 encounters a first beamsplitter 85 where the wavefront is split into two separate wavefronts 120, 122 traveling separate paths. The first wavefront 120 is reflected by the first beamsplitter 85 to a first mirror 81. The wavefront 120 is then reflected from the first mirror 81 to a second mirror 91 and on to a second beamsplitter 87. The second wavefront 122 passes through the first beamsplitter 85 and is represented as wavefront 122 where it is further reflected from a third mirror 83 to a fourth mirror 93 and on to the second beamsplitter 87. The second beamsplitter 87 serves to recombine the two wavefronts 120, 122 and direct the wavefronts to the imaging detector array. The arrangement of the two beamsplitters and four mirrors are such that, as each of the two wavefronts 92, 95 traverse their separate paths, and ultimately recombined, the separate wavefronts are tilted or angled relative to one another.

Similarly, FIG. 18b illustrates another arrangement of the optic elements within the present image plane interferometer 82. As with the earlier described embodiments, the incoming wavefront is split into two wavefronts 120, 122 each traveling separate optical paths. In this embodiment, however, the first wavefront 120 passes through the first beamsplitter 85 and is reflected from a first mirror 81 to a second mirror 91 and further passes through the second beamsplitter 87. The second wavefront 122, on the other hand, is reflected by the first beamsplitter 85 and is reflected from a third mirror 83 to a fourth mirror 93 and is further reflected by the second beamsplitter 87 where it is recombined with the first wavefront 120. As with the earlier embodiments, the arrangement of the two beamsplitters and four mirrors are such the exiting wavefronts 92, 95 are tilted or angled relative to one another. Note that coating 135 is disposed on only one side of beamsplitters 85 and 87 so that each wavefront 120 and 122 pass through the thickness of one of the beamsplitter substrates, thereby keeping the pathlengths substantially equal.

Figure 19A:
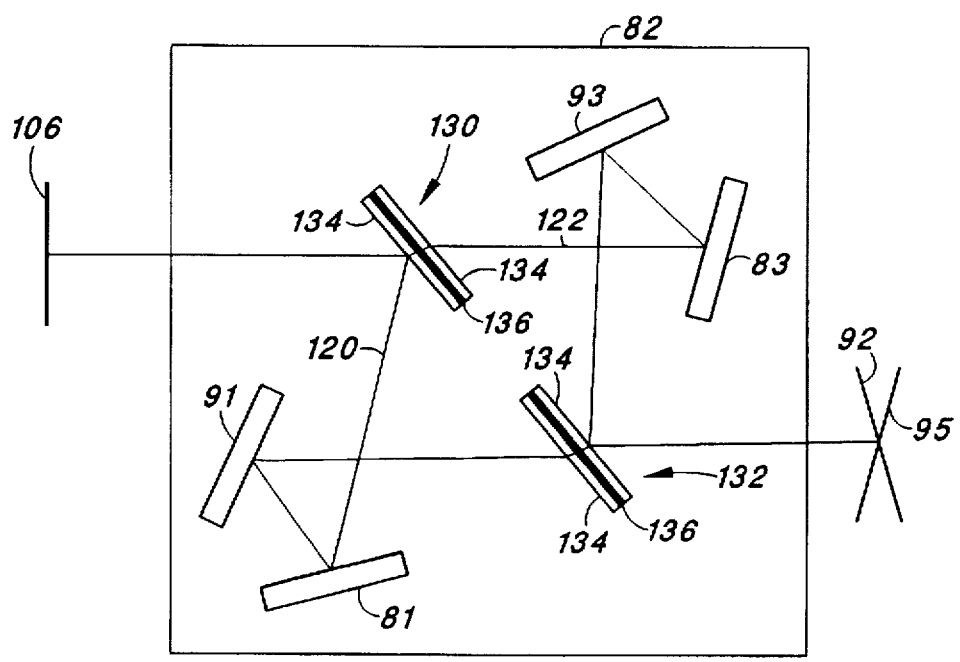
FIGS. 19a and 19b depict alternate optical geometries for the two beam image plane interferometer of FIG. 8 using beamsplitter mirrors which are of a "sandwich" construction.
Figure 19B:
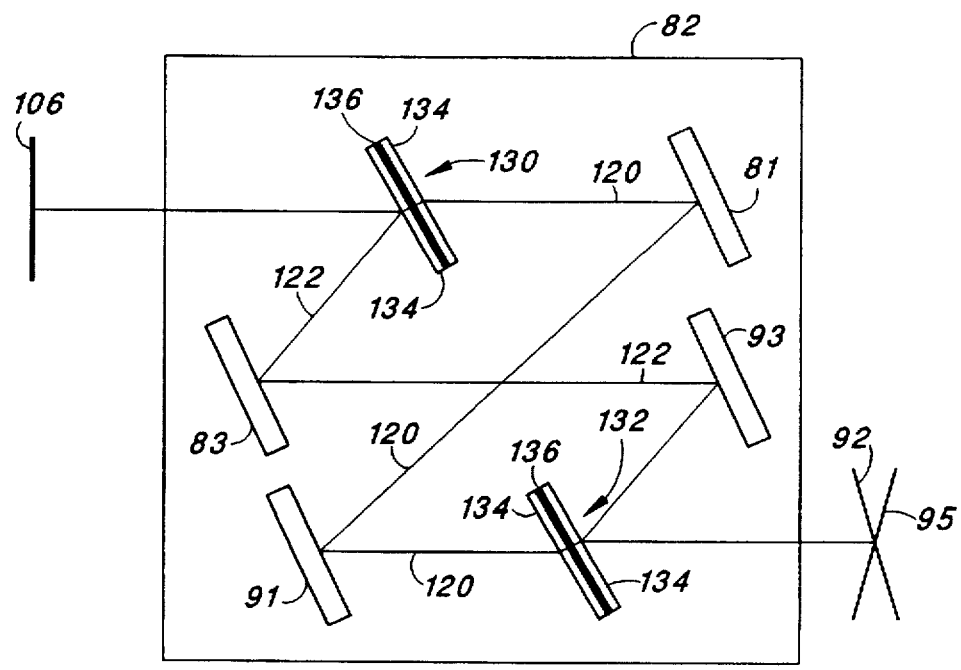

FIG. 19a and FIG. 19b show further embodiments of the two beams image plane interferometer geometries. The interferometers 82 illustrated in FIG. 19a and FIG. 19b are similar to the embodiments shown in FIG. 18a and FIG. 18b, respectively, except that the beamsplitters 130, 132 are of an alternate configuration. Specifically, the beamsplitters 130, 132 used in the embodiments illustrated in FIG. 19a and FIG. 19b include a pair of equal thickness glass substrates 134 sandwiching a partially reflecting surface 136.

Figure 20:
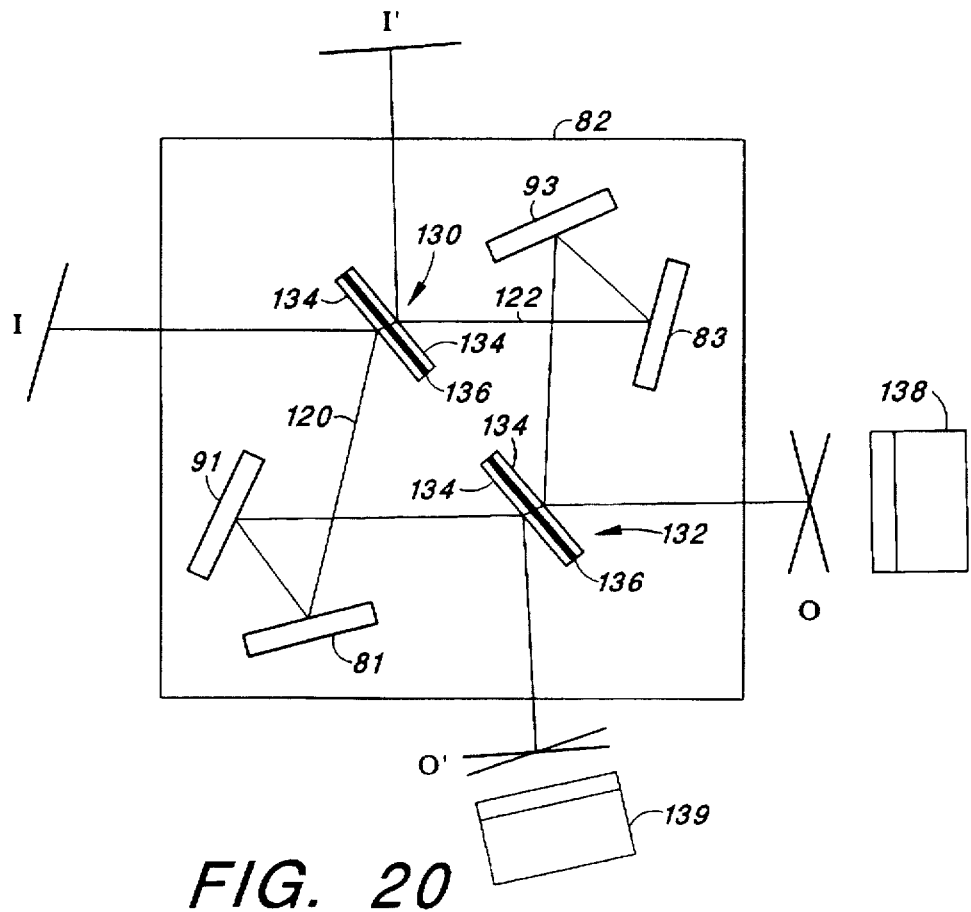
FIG. 20 is a schematic view of the image plane interferometer depicted in FIGS. 19a and 19b showing a multiple input and multiple output configuration.

An advantage of the embodiments illustrated in FIGS. 19a and 19b is the symmetrical geometry of the device. This configuration facilitates the use of multiple inputs and outputs. As shown in FIG. 20, an embodiment of the interferometer 82 includes multiple inputs, possibly one for data taking and one for calibration, and multiple output ports. For the illustrated symmetrical geometry, it can be shown that for an input into either I or I', the outputs, O and O' are complementary interference patterns. In other words, for an input of I, the output at O' is the complement of the output at O. Thus the modulated image detected by a CCD array at O', after suitable calibration and registration, could be subtracted from the modulated image detected by a CCD array at O, producing a new image with no waste of light signal. To further demonstrate the utility of this optical geometry, it can be shown that the same is true for input at I'. This allows a separate calibration channel to be used with the device, with identical interferometric results.

Alternatively, an image detector can be placed at each output as shown in FIG. 20 such that each output channel is adapted to detect differing wavelength bands. For example, the first detector 138 associated with output O may be adapted to detect infra-red wavelength bands whereas the second detector 139 may be adapted to visible spectrum wavelength bands.

Figure 21:
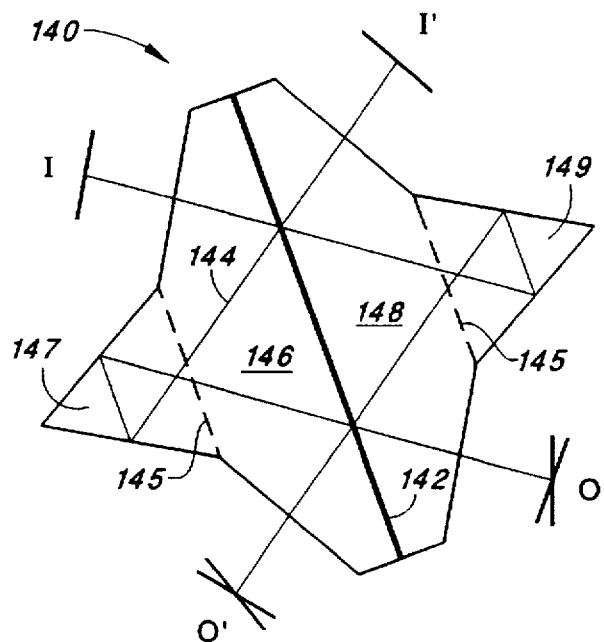
FIG. 21 depicts the optical arrangement of yet another embodiment of the image plane interferometer of FIG. 1 using a block prism beamsplitter.

FIG. 21 shows a solid prism form of the image plane interferometer 140. A single beamsplitter surface 142 bisects the prism 144. This might allow an interferometer 140 device to be built for very robust use. The prism type interferometer 140 could be fabricated from a solid block of material or, as illustrated, could be made from multiple blocks 146, 147, 148, 149 cemented together with thin bonds of optical cement 146. Since the embodiment illustrated in FIG. 21 is also of a symmetrical geometry, it facilitates the use of multiple inputs I and I' and outputs, O and O', as described above.

Figure 22:
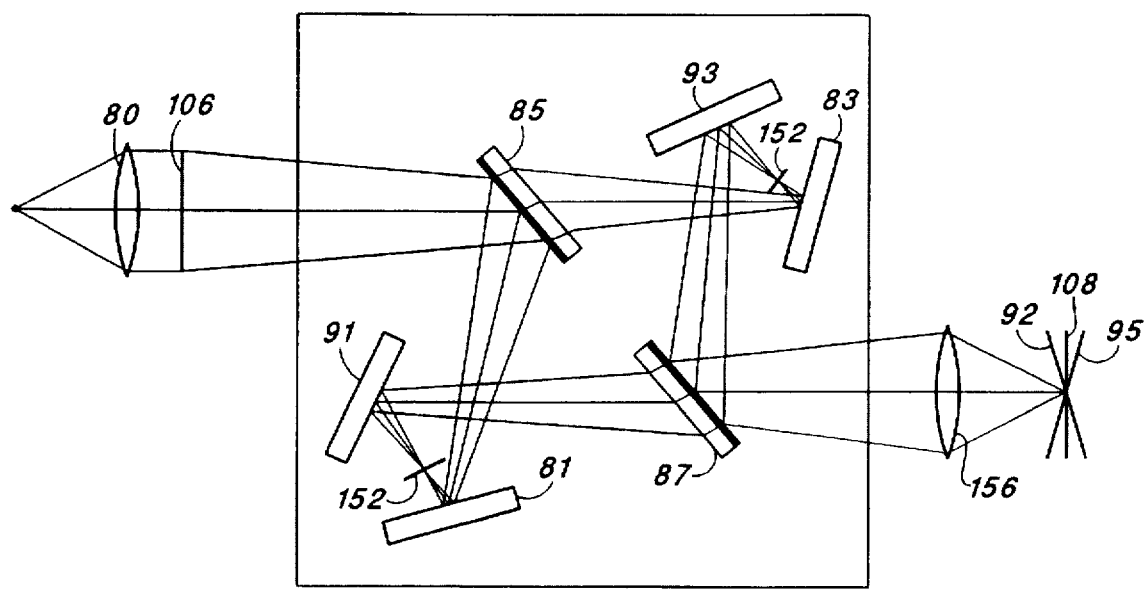
FIG. 22 depicts the optical arrangement of another embodiment of the image plane interferometer wherein the interfering image is located at an intermediate plane within the image plane interferometer.

FIG. 22 shows the optical geometry of yet another embodiment of the image plane interferometer 150 which has an intermediate interfering image plane 152 buried within the interferometer 150. In other words, the interferometer 150 receives an object scene wavefront 106 through an objective lens 80 which, without the interferometer, focuses the received radiation into a converging wavefront which comes to focus at the intermediate image plane 152 as opposed to focusing at the CCD array. This geometry, however, further requires a second set of relay optics 156 (e.g. exit lens) to re-image the interfering image plane wavefronts onto the CCD array. While this embodiment is slightly more complex, the device operates at a lower "f/no" number thereby providing more throughput. While the illustrated embodiment is shown using a pair of beamsplitters 85, 87 and four mirrors 81, 83, 91, 93, as described above with reference to FIG. 8, this optical geometry could be equally fashioned from a block prism as shown and described above (see FIG. 21).

Figure 23:
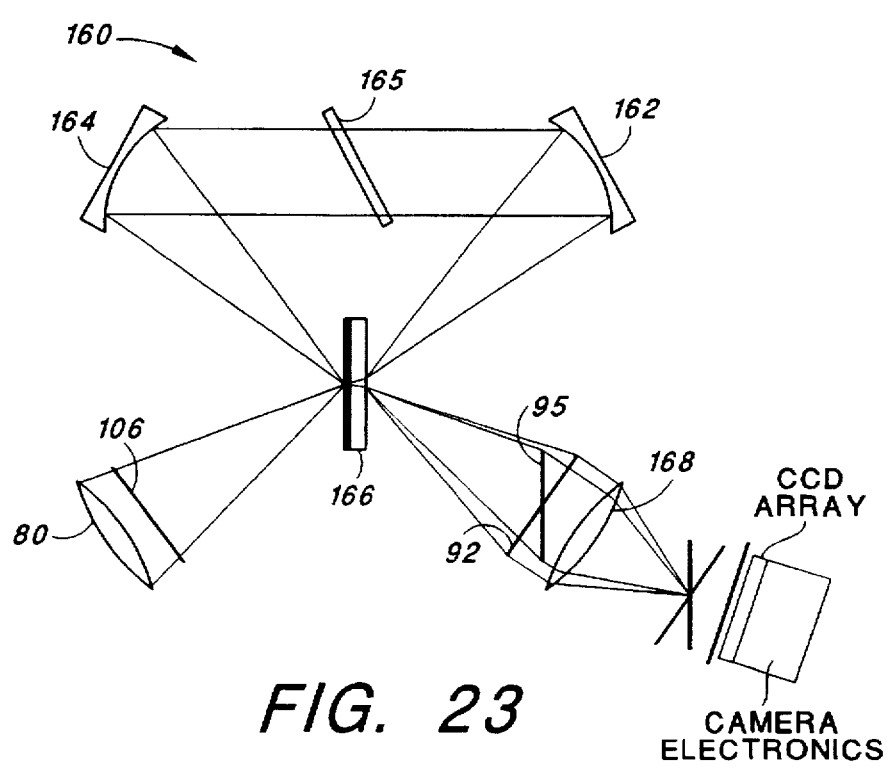
FIG. 23 depicts the optical arrangement of still another embodiment of the image plane interferometer employing a pair of off axis parabolas as relay lenses.

FIG. 23 shows yet another embodiment of the image plane interferometer 160 which uses a pair of off axis parabolas 162, 164 in a ring interferometer configuration together with a tilted glass plate 165 which is used to introduce angular tilt to the exiting wavefronts. Note that this is a imaging variation on a cyclic interferometer layout.

It is further contemplated that, using the basic theory of operation disclosed herein, a device could be designed which would have a very short "pushbroom" scan over a small number of pixels (e.g., 8 pixels). While this geometry would allow only a low spectral resolution observation of this scene, it would allow a narrow strip of pixels to provide three color images such as color video, without the use of three image tubes or filters. Thus it is contemplated that a three color camera can be built using the design principles of the present High Etendue Imaging Fourier Transform Spectrometer, disclosed herein.

From the foregoing, it should be appreciated that the present invention thus provides a high Etendue imaging Fourier Transform spectrometer and associated method that utilizes no moving parts for autocorrelation modulation, yet operates at a resolution and throughput comparable to Michelson Interferometer based devices. While the present invention has been described in terms of preferred embodiments, it is to be understood that the invention is not to be limited to the exact form of the apparatus or processes disclosed. Rather, various modifications and variations can be made thereto by those skilled in the art without departing from the scope of the invention or without sacrificing all of its material advantages as set forth in the claims.

What is claimed is:

1. A high etendue imaging Fourier transform spectrometer comprising:

an image forming optical element for converging radiation received from a defined target having a plurality of scene areas into a target wavefront;

an image plane interferometer adapted to receive said target wavefront and create a pair of wavefronts oriented at an angle with respect to one another, said angled wavefronts converging to an image plane where said angled wavefronts interfere to produce an interference wavefront such that an intensity of said radiation at each of said scene areas on said interference wavefront as a function of time as each scene area moves across said image plane corresponds to an autocorrelation function of each of said scene areas at an offset prescribed by said angle and a spatial position of said scene area;

an imaging detector disposed proximate said image plane and adapted for recording said intensity of said radiation at each of said scene areas on said interference wavefront as a function of time as each scene area moves across said image plane; and an image data analyzer for processing said intensity data to produce an autocorrelation function data set for each of said scene areas and for determining a Fourier transform of said autocorrelation function data set for each of said scene areas, said image data analyzer comprising means for collection of raw image data, said raw image data representing the time history of said intensity as measured by said imaging detector for each scene area, means for calibrating said raw image data for each scene area using dark field and flat field calibration data, means for array processing said calibrated image data to produce the autocorrelation function data set for each scene area, means for Fourier transforming said autocorrelation function data set for each of said scene areas to produce an output of spectrum data for each scene area, and means for displaying said output of spectrum data for each scene area.

2. The imaging Fourier transform spectrometer of claim 1 wherein said image forming optical element further comprises a lens for forming said target wavefront and an iris for controlling an amount of radiation received from said target.

3. The imaging Fourier transform spectrometer of claim 1 further comprising a scan mechanism for controlling the relative movement of said target across said image plane.

4. The imaging Fourier transform spectrometer of claim 3 wherein said scan mechanism includes a scan mirror disposed proximate said image forming optic element, said scan mirror adapted for rotation about an axis perpendicular to the relative motion of said target in said image plane.

5. The imaging Fourier transform spectrometer of claim 3 wherein said scan mechanism includes a moving platform wherein the motion of said platform provides said target with a relative velocity across said image plane.

6. The imaging Fourier transform spectrometer of claim 1 wherein said imaging detector for recording said intensity of said radiation at each scene area on said interference wavefront as a function of time as each scene area moves across said image plane is a charge coupled device (CCD) array camera.

7. The imaging Fourier transform spectrometer of claim 6 wherein said CCD array camera includes a CCD array of prescribed dimensions having a plurality of pixels such that each scene area moves across said image plane from a first pixel on said CCD array to an adjacent pixel in said CCD array in a given direction during each readout time interval of said CCD array.

8. The imaging Fourier transform spectrometer of claim 2 wherein said lens is adapted for focusing said radiation at an intermediate image plane located within said image plane interferometer and said imaging Fourier transform spectrometer further includes relay optics interposed between said image plane interferometer and said imaging detector, said relay optics adapted for re-focusing said angled wavefronts exiting said image plane interferometer to said image plane proximate said imaging detector.

9. The imaging Fourier transform spectrometer of claim 3 further comprising a control system operatively associated with said image forming optical element, said scan mechanism, and said imaging detector.

10. The imaging spectrometer of claim 1 wherein said image plane interferometer is a two-beam interferometer including a pair of beamsplitters and a plurality of mirrors adapted to create said pair of wavefronts oriented at said angle with respect to one another and wherein a difference in pathlengths traversed by each of said angled wavefronts is less than a coherent length of said radiation.

11. The imaging spectrometer of claim 10 wherein said beamsplitters include a pair of equal thickness glass substrates sandwiching a partially reflecting beamsplitting surface.

12. The imaging spectrometer of claim 10 wherein said beamsplitters include a glass substrate having a partially reflecting beamsplitting coating applied to one surface of said glass substrate.

13. The imaging spectrometer of claim 1 wherein said image plane interferometer includes a block prism having a beamsplitting surface which bisects said block prism.

14. The imaging spectrometer of claim 13 wherein said block is a segmented block prism including a plurality of prismatic blocks cemented together with optical cement.

15. The imaging spectrometer of claim 1 wherein said image plane interferometer further includes multiple inputs and multiple outputs.

16. Apparatus for determining a spectrum associated with radiation received from a target comprising:

an image plane; and an interferometer that generates first and second wavefronts oriented at an angle with respect to one another, each wavefront having an image associated with the target with a broadband spectrum range and traveling a pathlength from the target to the image plane that is within the coherence length of the pathlength of the other wavefront, the interferometer including:
a first beamsplitter adapted to receive an input wavefront from the target radiation and produce the first and second wavefronts therefrom,
a first set of mirrors that creates a first optical path along which the first wavefront traverses,
a second set of mirrors that creates a second optical path along which the second wavefront traverses, and
a second beamsplitter adapted to recombine the first and second wavefronts after respectively traversing the first and second optical paths such that the first and second wavefronts are tilted at said angle with respect to one another while selected image points of the first and second wavefronts are co-located to ensure lateral coherence of the first and second wavefronts resulting in an interference pattern.

17. The apparatus for determining spectrum associated with radiation of claim 16 further comprising an optical detector having a pixel array, responsive to the interference pattern that is oriented in the plane of the image plane and that generates signals representing the intensity of radiation in the interference pattern collected by each array pixel.

18. The apparatus for determining spectrum associated with radiation of claim 17 further comprising an image data analyzer for processing the intensity data collected by each array pixel to produce an autocorrelation function data set for the radiation and for determining a Fourier transform of the autocorrelation function data set to yield the spectrum associated with the radiation.

19. The apparatus for determining spectrum associated with radiation of claim 17 further comprising:
a lens for imaging the radiation from the target at the image plane; and
an iris for controlling an amount of radiation received from the target.

20. The apparatus for determining spectrum associated with radiation of claim 17 wherein the optical detector is a charge coupled device (CCD) array camera.

21. An image plane interferometer comprising:
a first beamsplitter adapted to receive an input wavefront and produce a first wavefront and a second wavefront traveling separate optical paths;
a first set of mirrors adapted to reflect said first wavefront along a first optical path and a second set of mirrors adapted to reflect said second wavefront along a second optical path, wherein said first optical path and second optical path have substantially equal pathlengths; and
a second beamsplitter adapted to spatially recombine said first and second wavefronts such that said first and second wavefronts are tilted at a prescribed angle with respect to one another while selected image points of said first and second wavefronts are co-located to ensure lateral coherence of said first and second wavefronts resulting in said interference pattern.

22. The image plane interferometer of claim 21 wherein one or both of said beamsplitters include a pair of equal thickness glass substrates sandwiching a partially reflecting beamsplitting surface.

23. The image plane interferometer of claim 21 wherein one or both of said beamsplitters include a glass substrate having a partially reflecting beamsplitting coating applied to one surface of said glass substrate.

24. The image plane interferometer of claim 21 further comprising a prism block having a plurality of reflecting surfaces and a beamsplitting surface bisecting said prism block.

25. A method for determining a spectrum associated with radiation received from a target comprising:
receiving the radiation at a two-beam interferometer;
generating first and second wavefronts oriented at an angle with respect to one another, each wavefront having an image associated with the target with a broadband spectrum range and traveling a pathlength from the target to an image plane that is within the coherence length of the pathlength of the other wavefront;
superimposing the first and second wavefronts in the image plane to generate an interference pattern;
detecting the intensity of radiation of the interference pattern;
generating signals representing the intensity of radiation of the interference pattern;
collecting the signals representing the intensity of radiation of the interference pattern;
calibrating the signals using dark field and flat field calibration data to produce calibrated image data;
array processing the calibrated image data to produce an autocorrelation function data set; and
determining a Fourier transform of the autocorrelation function data set to yield the spectrum associated with the radiation.

26. The apparatus for determining spectrum associated with radiation of claim 25 further comprising the steps of:
imaging the radiation from the target at the image plane; and
controlling the amount of radiation received from the target.

27. A high etendue imaging Fourier transform spectrometer comprising:
an image forming optical element for converging radiation received from a defined target having a plurality of scene areas into a target wavefront;
an image plane interferometer comprising a pair of beamsplitters and a plurality of mirrors adapted to receive said target wavefront and create a pair of wavefronts oriented at an angle with respect to one another, said pair of beamsplitters including a pair of equal thickness glass substrates sandwiching a partially reflecting beamsplitting surface, wherein each wavefront of the pair of wavefronts traverses a different optical path, the different optical paths having a difference in pathlengths that is less than a coherent length of said radiation, said angled wavefronts converging to an image plane where said angled wavefronts interfere to produce an interference wavefront such that an intensity of said radiation at each scene area of said plurality of scene areas on said interference wavefront as a function of time as each scene area moves across said image plane corresponds to an autocorrelation function of each of said scene areas at an offset prescribed by said angle and a spatial position of said scene area;
an imaging detector disposed proximate said image plane and adapted for recording said intensity of said radiation at each of said scene areas on said interference wavefront as a function of time as each scene area moves across said image plane; and
an image data analyzer for processing said intensity data to produce an autocorrelation function data set for each of said scene areas and for determining a Fourier transform of said autocorrelation function data set for each of said scene areas;

wherein said Fourier Transform of said autocorrelation function data set for each of said scene areas yields a spectrum associated with said scene area.

28. A high etendue imaging Fourier transform spectrometer comprising:

an image forming optical element for converging radiation received from a defined target having a plurality of scene areas into a target wavefront;

an image plane interferometer comprising a pair of beamsplitters and a plurality of mirrors adapted to receive said target wavefront and create a pair of wavefronts oriented at an angle with respect to one another, said pair of beamsplitters including a glass substrate having a partially reflecting beamsplitting coating applied to one surface of said glass substrate, wherein each wavefront of the pair of wavefronts traverses a different optical path, the different optical paths having a difference in pathlengths that is less than a coherent length of said radiation, said angled wavefronts converging to an image plane where said angled wavefronts interfere to produce an interference wavefront such that an intensity of said radiation at each of said scene areas on said interference wavefront as a function of time as each scene area moves across said image plane corresponds to an autocorrelation function of each of said scene areas at an offset prescribed by said angle and a spatial position of said scene area;

an imaging detector disposed proximate said image plane and adapted for recording said intensity of said radiation at each of said scene areas on said interference wavefront as a function of time as each scene area moves across said image plane; and an image data analyzer for processing said intensity data to produce an autocorrelation function data set for each of said scene areas and for determining a Fourier transform of said autocorrelation function data set for each of said scene areas;

wherein said Fourier Transform of said autocorrelation function data set for each of said scene areas yields a spectrum associated with said scene area.

29. A high etendue imaging Fourier transform spectrometer comprising:

an image forming optical element for converging radiation received from a defined target having a plurality of scene areas into a target wavefront;

an image plane interferometer adapted to receive said target wavefront and create a pair of wavefronts oriented at an angle with respect to one another, said angled wavefronts converging to an image plane where said angled wavefronts interfere to produce an interference wavefront such that an intensity of said radiation at each of said scene areas on said interference wavefront as a function of time as each scene area moves across said image plane corresponds to an autocorrelation function of each of said scene areas at an offset prescribed by said angle and a spatial position of said scene area, said image plane interferometer having multiple inputs and multiple outputs;

an imaging detector disposed proximate said image plane and adapted for recording said intensity of said radiation at each of said scene areas on said interference wavefront as a function of time as each scene area moves across said image plane; and an image data analyzer for processing said intensity data to produce an autocorrelation function data set for each of said scene areas and for determining a Fourier transform of said autocorrelation function data set for each of said scene areas;

wherein said Fourier Transform of said autocorrelation function data set for each of said scene areas yields a spectrum associated with said scene area.

30. An image plane interferometer comprising:

a first beamsplitter adapted to produce first and second wavefronts from input radiation;

a first set of reflective surfaces adapted to reflect the first wavefront along a first optical path;

a second set of reflective surfaces adapted to reflect the second wavefront along a second optical path;

wherein the first and second optical paths have substantially equal pathlengths; and a second beamsplitter adapted to recombine the first and second wavefronts such that the first and second wavefronts are tilted at a prescribed angle with respect to one another while selected image points of the first and second wavefronts are co-located to ensure lateral coherence of the first and second wavefronts, resulting in an interference pattern.

* * * * *